United States Patent
Tucker

(10) Patent No.: US 12,028,578 B2
(45) Date of Patent: Jul. 2, 2024

(54) METHODS AND APPARATUS TO DETERMINE DEMOGRAPHIC CLASSIFICATIONS FOR CENSUS LEVEL IMPRESSION COUNTS AND UNIQUE AUDIENCE SIZES

(71) Applicant: THE NIELSEN COMPANY (US), LLC, New York, NY (US)

(72) Inventor: Jessica N. Tucker, Elgin, IL (US)

(73) Assignee: The Nielsen Company (US), LLC, New York, NY (US)

(*) Notice: Subject to any disclaimer, the term of this patent is extended or adjusted under 35 U.S.C. 154(b) by 0 days.

(21) Appl. No.: 17/953,136

(22) Filed: Sep. 26, 2022

(65) Prior Publication Data
US 2023/0096891 A1   Mar. 30, 2023

Related U.S. Application Data
(60) Provisional application No. 63/248,943, filed on Sep. 27, 2021.

(51) Int. Cl.
*H04N 21/466* (2011.01)
*H04N 21/258* (2011.01)

(52) U.S. Cl.
CPC ... *H04N 21/4667* (2013.01); *H04N 21/25883* (2013.01)

(58) Field of Classification Search
CPC ........ H04N 21/4667; H04N 21/25883; H04N 21/251; G06Q 30/0201; G06Q 30/0242; G06Q 30/0277
See application file for complete search history.

(56) References Cited

U.S. PATENT DOCUMENTS

| | | | |
|---|---|---|---|
| 6,108,637 A * | 8/2000 | Blumenau | G06Q 30/0256 715/204 |
| 8,370,489 B2 * | 2/2013 | Mazumdar | H04L 43/04 709/224 |
| 8,930,701 B2 * | 1/2015 | Burbank | H04L 9/32 713/171 |
| 9,237,138 B2 | 1/2016 | Bosworth et al. | |
| 10,045,057 B2 | 8/2018 | Shah et al. | |
| 11,568,431 B2 | 1/2023 | Rao et al. | |
| 2015/0262207 A1 | 9/2015 | Rao et al. | |
| 2018/0005038 A1 * | 1/2018 | Granström | G06V 10/809 |
| 2019/0147466 A1 | 5/2019 | Rao et al. | |
| 2021/0014568 A1 | 1/2021 | Nagaraja Rao et al. | |

* cited by examiner

*Primary Examiner* — Nathan J Flynn
*Assistant Examiner* — Christine A Kurien

(57) ABSTRACT

Methods, apparatus, systems and articles of manufacture to determine demographic classifications for census level impression counts and unique audience sizes are disclosed. In an example, the apparatus includes media tag format circuitry to generate a reformatted media tag corresponding to an impression request. The example apparatus also includes model execution circuitry to execute a machine learning model based on the reformatted media tag to generate outputs, the outputs including at least a value representative of a probability of an occurrence of a demographic classification. The example apparatus further includes audience counting circuitry to assign an identification of ones of audience members in a group to the demographic classification based at least on the outputs.

24 Claims, 13 Drawing Sheets

| C Only | M Only | F Only | C & M | C & F | M & F | 3+ Demos |
|--------|--------|--------|-------|-------|-------|----------|
| 0.89   | 0.04   | 0.44   | 0.14  | 0.67  | 0.10  | 0.06     |

FIG. 4

METHODS AND APPARATUS TO DETERMINE DEMOGRAPHIC CLASSIFICATIONS FOR CENSUS LEVEL IMPRESSION COUNTS AND UNIQUE AUDIENCE SIZES

RELATED APPLICATION

This patent claims the benefit of U.S. Provisional Patent Application No. 63/248,943, which was filed on Sep. 27, 2021. U.S. Provisional Patent Application No. 63/248,943 is hereby incorporated herein by reference in its entirety. Priority to U.S. Provisional Patent Application No. 63/248,943 is hereby claimed.

FIELD OF THE DISCLOSURE

This disclosure relates generally to computer processing and, more particularly, to determine demographic classifications for census level impression counts and unique audience sizes.

BACKGROUND

Tracking user access to digital media has been used by broadcasters and advertisers to determine viewership information for the digital media. Digital media is also known as Internet-accessible media. Tracking viewership of digital media can present useful information to broadcasters and advertisers when determining placement strategies for digital advertising. The success of advertisement placement strategies is dependent on the accuracy that technology can achieve in generating audience metrics.

BRIEF DESCRIPTION OF THE DRAWINGS

FIG. 4 illustrates an example of an array of probabilities output by a machine learning model for three demographic classifications.

Figure 1:
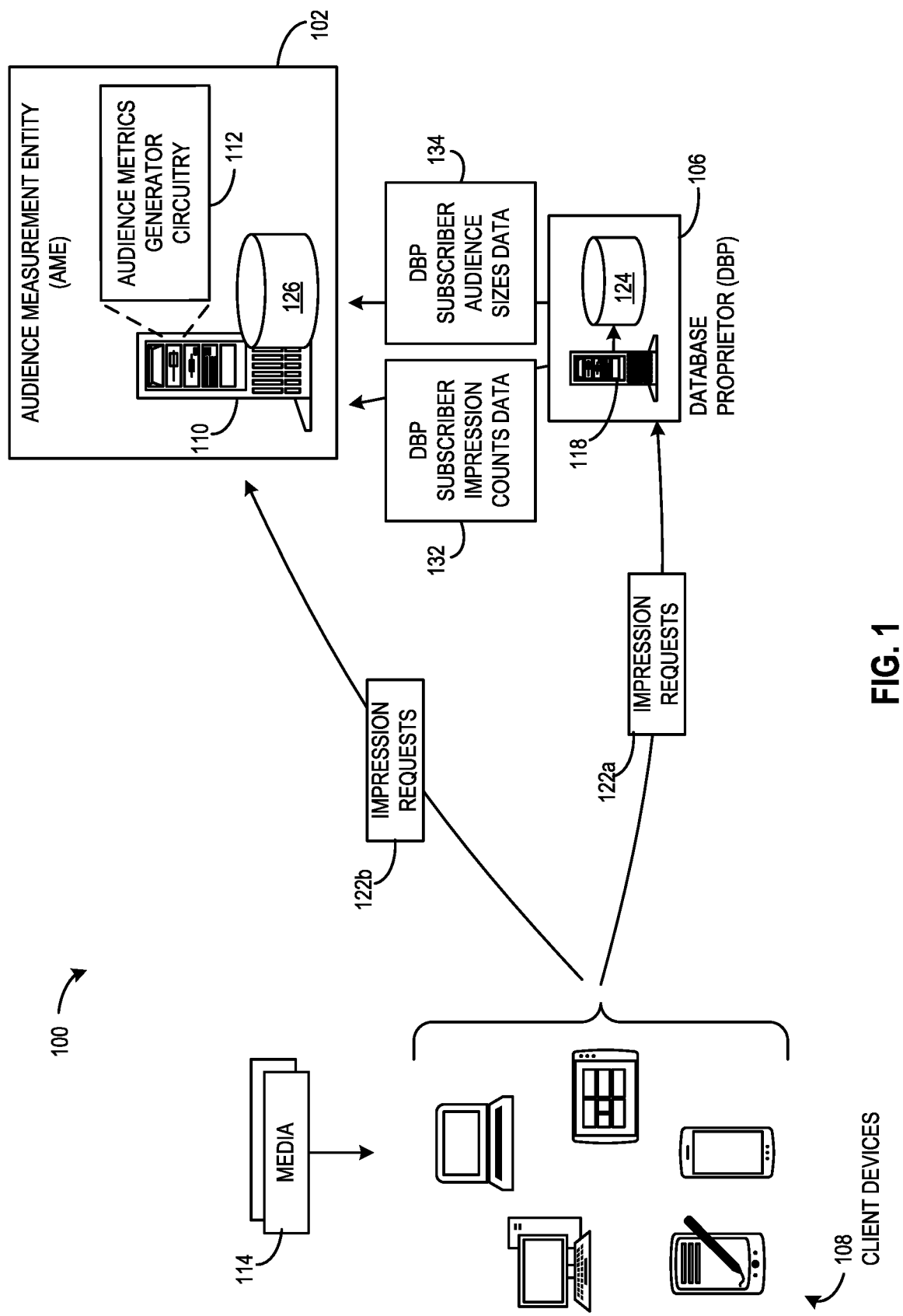
FIG. 1 is an example system for logging impressions of media accessed via client devices.

The figures are not to scale. In general, the same reference numbers will be used throughout the drawing(s) and accompanying written description to refer to the same or like parts. Connection references (e.g., attached, coupled, connected, and joined) are to be construed broadly and may include intermediate members between a collection of elements and relative movement between elements unless otherwise indicated. As such, connection references do not necessarily infer that two elements are directly connected and in fixed relation to each other.

Descriptors "first," "second," "third," etc. are used herein when identifying multiple elements or components which may be referred to separately. Unless otherwise specified or understood based on their context of use, such descriptors are not intended to impute any meaning of priority, physical order or arrangement in a list, or ordering in time but are merely used as labels for referring to multiple elements or components separately for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for ease of referencing multiple elements or components. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events. As used herein, "processor circuitry" is defined to include (i) one or more special purpose electrical circuits structured to perform specific operation(s) and including one or more semiconductor-based logic devices (e.g., electrical hardware implemented by one or more transistors), and/or (ii) one or more general purpose semiconductor-based electrical circuits programmed with instructions to perform specific operations and including one or more semiconductor-based logic devices (e.g., electrical hardware implemented by one or more transistors). Examples of processor circuitry include programmed microprocessors, Field Programmable Gate Arrays (FPGAs) that may instantiate instructions, Central Processor Units (CPUs), Graphics Processor Units (GPUs), Digital Signal Processors (DSPs), XPUs, or microcontrollers and integrated circuits such as Application Specific Integrated Circuits (ASICs). For example, an XPU may be implemented by a heterogeneous computing system including multiple types of processor circuitry (e.g., one or more FPGAs, one or more CPUs, one or more GPUs, one or more DSPs, etc., and/or a combination thereof) and application programming interface(s) (API(s)) that may assign computing task(s) to whichever one(s) of the multiple types of the processing circuitry is/are best suited to execute the computing task(s).

DETAILED DESCRIPTION

Techniques for monitoring user access to an Internet-accessible media, such as digital television (DTV) media and digital content ratings (DCR) media, have evolved substantially over the years. Internet-accessible media is also known as digital media. In the past, such monitoring was done primarily through server logs. In particular, entities serving media on the Internet would log the number of requests received for their media at their servers. Basing Internet usage research on server logs is problematic for several reasons. For example, server logs can be tampered with either directly or via zombie programs, which repeatedly request media from the server to increase the server log counts. Also, media is sometimes retrieved once, cached locally and then repeatedly accessed from the local cache without involving the server. Server logs cannot track such repeat views of cached media. Thus, server logs are susceptible to both over-counting and under-counting errors.

Internet monitoring of media may include tagging media with monitoring instructions. In particular, monitoring instructions are associated with the hypertext markup language (HTML) of the media to be tracked. When a client requests the media, both the media and the monitoring instructions are downloaded to the client device. The monitoring instructions are, thus, executed whenever the media is accessed, be it from a server or from a cache. Upon execution, the monitoring instructions cause the client device to send or transmit monitoring information from the client device to a content provider site. The monitoring information is indicative of the manner in which content was displayed.

In some implementations, an impression request or ping request can be used to send or transmit monitoring information by a client device using a network communication in the form of a hypertext transfer protocol (HTTP) request. In this manner, the impression request or ping request reports the occurrence of a media impression at the client device. For example, the impression request or ping request includes information to report access to a particular item of media (e.g., an advertisement, a webpage, an image, video, audio, etc.). In some examples, the impression request or ping request can also include a cookie previously set in the browser of the client device that may be used to identify a user that accessed the media. That is, impression requests or ping requests cause monitoring data reflecting information about an access to the media to be sent from the client device that downloaded the media to a monitoring entity and can provide a cookie to identify the client device and/or a user of the client device. In some examples, the monitoring entity is an audience measurement entity (AME) that did not provide the media to the client device and who is a trusted (e.g., neutral) third party for providing accurate usage statistics (e.g., The Nielsen Company, LLC). Since the AME is a third party relative to the entity serving the media to the client device, the cookie sent to the AME in the impression request to report the occurrence of the media impression at the client device is a third-party cookie. Third-party cookie tracking is used by measurement entities to track access to media accessed by client devices from first-party media servers.

There are many database proprietors operating on the Internet. These database proprietors provide services to large numbers of subscribers. In exchange for the provision of services, the subscribers register with the database proprietors. Examples of such database proprietors include social network sites (e.g., Facebook, Twitter, MySpace, etc.), multi-service sites (e.g., Yahoo!, Google, Axiom, Catalina, etc.), online retailer sites (e.g., Amazon.com, Buy.com, etc.), credit reporting sites (e.g., Experian), streaming media sites (e.g., YouTube, Hulu, Tubi, etc.), etc. These database proprietors set cookies and/or other device/user identifiers on the client devices of their subscribers to enable the database proprietors to recognize their subscribers when they visit their web sites.

The protocols of the Internet make cookies inaccessible outside of the domain (e.g., Internet domain, domain name, etc.) on which they were set. Thus, a cookie set in, for example, the facebook.com domain (e.g., a first party) is accessible to servers in the facebook.com domain, but not to servers outside that domain. Therefore, although an AME (e.g., a third party) might find it advantageous to access the cookies set by the database proprietors, they are unable to do so.

An AME may leverage the existing databases of database proprietors to collect more extensive Internet usage by extending the impression request process to encompass partnered database proprietors and by using such partners as interim data collectors. The AME may be structured to respond to impression requests from clients (who may not be a member of an audience measurement panel and, thus, may be unknown to the AME) by redirecting the clients from the AME to a database proprietor, such as a social network site partnered with the AME, using an impression response. Such a redirection initiates a communication session between the client accessing the tagged media and the database proprietor. For example, the impression response received at the client device from the AME may cause the client device to send a second impression request to the database proprietor. In response to the database proprietor receiving this impression request from the client device, the database proprietor (e.g., Facebook) can access any cookie it has set on the client to thereby identify the client device based on the internal records of the database proprietor. In the event the client device corresponds to a subscriber of the database proprietor, the database proprietor logs/records a database proprietor demographic impression in association with the user/client device.

As used herein, an impression is defined to be an event in which a home or individual accesses and/or is exposed to media (e.g., an advertisement, content, a group of advertisements and/or a collection of content). In Internet media delivery, a quantity of impressions or impression count is the total number of times media (e.g., content, an advertisement, or advertisement campaign) has been accessed by a web population (e.g., the number of times the media is accessed). In some examples, an impression or media impression is logged by an impression collection entity (e.g., an AME or a database proprietor) in response to an impression request from a user/client device that requested the media. For example, an impression request is a message or communication (e.g., an HTTP request) sent by a client device to an impression collection server to report the occurrence of a media impression at the client device. In some examples, a media impression is not associated with demographics. In non-Internet media delivery, such as television (TV) media, a television or a device attached to the television (e.g., a set-top-box or other media monitoring device) may monitor media being output by the television. The monitoring generates a log of impressions associated with the media displayed on the television. The television and/or connected device may transmit impression logs to the impression collection entity to log the media impressions.

A user of a computing device (e.g., a mobile device, a tablet, a laptop, etc.) and/or a television may be exposed to the same media via multiple devices (e.g., two or more of a mobile device, a tablet, a laptop, etc.) and/or via multiple media types (e.g., digital media available online, digital TV (DTV) media temporality available online after broadcast, TV media, etc.). For example, a user may start watching a favorite television program on a television as part of TV media, pause the favorite program, and continue to watch the favorite program on a tablet as part of DTV media. In such an example, the exposure to the program may be logged by an AME twice, once for an impression log associated with the television exposure, and once for the impression request generated by a tag (e.g., a census measurement science (CMS) tag) executed on the tablet. Multiple logged impressions associated with the same program and/or same user are defined as duplicate impressions. Duplicate impressions are problematic in determining total reach estimates because one exposure via two or more cross-platform devices may be counted as two or more unique audience members. As used herein, reach is a measure indicative of the demographic coverage achieved by media (e.g., demographic group(s) and/or demographic population(s) exposed to the media). For example, media reaching a broader demographic base will have a larger reach than media that reached a more limited demographic base. The reach metric may be measured by tracking impressions for known users (e.g., panelists or non-panelists) for which an audience measurement entity stores demographic information or can obtain demographic information. Deduplication is a process that adjusts cross-platform media exposure totals by reducing (e.g., eliminating) the double counting of individual audience members that were exposed to media via more than one platform and/or are represented in more than one database of media impressions used to determine the reach of the media.

As used herein, a unique audience is based on audience members distinguishable from one another. That is, a particular audience member exposed to particular media is measured as a single unique audience member regardless of how many times that audience member is exposed to that particular media or the particular platform(s) through which the audience member is exposed to the media. If that particular audience member is exposed multiple times to the same media, the multiple exposures for the particular audience member to the same media are counted as only a single unique audience member. In this manner, impression performance for particular media is not disproportionately represented when a small subset of one or more audience members is exposed to the same media an excessively large number of times while a larger number of audience members is exposed fewer times or not at all to that same media. By tracking exposures to unique audience members, a unique audience measure may be used to determine a reach measure to identify how many unique audience members are reached by media. In some examples, increasing the unique audience and, thus, reach, is useful for advertisers wishing to reach a larger audience base.

Notably, although third-party cookies are useful for third-party measurement entities in many of the above-described techniques to track media accesses and to leverage demographic information from third-party database proprietors, use of third-party cookies may be limited or may cease in some or all online markets. That is, use of third-party cookies enables sharing anonymous subscriber information (without revealing personally identifiable information (PII)) across entities which can be used to identify and deduplicate audience members across database proprietor impression data. However, to reduce or eliminate the possibility of revealing user identities outside database proprietors by such anonymous data sharing across entities, some websites, internet domains, and/or web browsers will stop (or have already stopped) supporting third-party cookies. This will make it more challenging for third-party measurement entities to track media accesses via first-party servers. That is, although first-party cookies will still be supported and useful for media providers to track accesses to media via their own first-party servers, neutral third parties interested in generating neutral, unbiased audience metrics data will not have access to the impression data collected by the first-party servers using first-party cookies. Examples disclosed herein may be implemented with or without the availability of third-party cookies because, as mentioned above, the datasets used in the deduplication process are generated and provided by database proprietors, which may employ first-party cookies to track media impressions from which the datasets are generated.

Examples disclosed herein estimate total unique audience sizes and impression counts of a universe audience for media based on census-level audience metrics information collected by an AME that includes census-level impression counts and/or unique total audience sizes but does not include demographic classifications for the census-level impression counts and audience sizes. As used herein, a universe audience (also referred to as a total audience) for media is a total number of unique persons that accessed the media in a particular geographic scope of interest for audience metrics, via one or more websites/webpages, via one or more internet domains, and/or during a duration of interest for the audience metrics. Example geographic scopes of interest could be a city, a metropolitan area, a state, a country, etc. As used herein, a census-level impression (e.g., a census impression) is an impression that is logged for an access to media by a user for which demographic information is unknown. Thus, a census-level impression is indicative of an access to media but not indicative of the audience member to which the access should be attributed. As such, census-level impressions are logged as anonymous accesses to media by an AME to generate impression counts for media. Since the census-level impressions are anonymous, they are not directly indicative of total unique audience sizes because multiple census-level impression counts may be attributed to the same person (e.g., the same person visits the same website multiple times and/or visits multiple different websites that present the same advertisement, and each presentation of that advertisement is reported as a separate impression, albeit for the same person). However, in some examples, an AME is able to deduplicate impressions counts for the same person in order to determine a census-level total audience size. For example, if there are multiple census-level impressions counts attributed to the same person, the AME can use methods to deduplicate those counts towards the audience size (e.g., the audience size is increased only once for all of that person's impression counts and not once for each impression count individually). Examples disclosed herein are able to determine total census-level audience size in accordance with the logged census-level impression counts.

Examples disclosed herein also leverage database proprietor subscriber-level audience metrics information that provides partial information on impression counts and unique audience sizes. For example, a database proprietor may collect database proprietor subscriber-level audience metrics information based on media accesses by subscribers of services provided by the database proprietors. Since the database proprietors store user information about their subscribers, the database proprietors can log demographic impressions. As used herein, a demographic impression associates user demographics of a subscriber with a logged impression of media accessed by that subscriber. Using demographic impressions, the database proprietor generates the database proprietor subscriber-level audience metrics.

The AME may enter into an agreement or partnership with one or more database proprietors to obtain access to demographic impression data from subscribers of the database proprietors. However, to protect PII of their subscribers, database proprietors generalize their subscriber-level audience metrics information to aggregate data (e.g., database proprietor aggregate subscriber-based audience metrics information) by generating impression counts and unique audience sizes per demographic category (e.g., females 13-18, males 13-18, females 19-23, males 19-23, etc.). Examples disclosed herein use that database proprietor aggregate subscriber-based audience metrics information to determine individual demographic classifications for impression counts and unique audience sizes for the AME-collected census impressions.

In the context of generating digital advertising ratings (e.g., using media tagging techniques such as embedding beacon instructions in internet-accessible media), known accurate information can be collected about the number of times a particular advertisement was accessed (e.g., an impression count). In some examples, the audience information can be collected in connection with the particular advertisement. However, audience information on how the audience and impression count is distributed across multiple demographics are unknown. Beacon instructions embedded in media cause a browser to report impressions by sending cookies to a database proprietor that matches the cookies with its database of subscriber information. In this manner, the database proprietor logs demographic impressions associating demographics from subscriber accounts or profiles corresponding to the received cookies of the browser-reported impressions. As not everyone may be a subscriber of the database proprietor, all of the impressions pertaining to a non-subscriber are lost or unusable by the database proprietor to generate demographic impressions. Additionally, only a partial set of impressions may be collected for known users due to possibly those users deleting their cookies in their browsers or due to using public computers in which cookies are disabled or are set in browsers without definitive corresponding users. What is returned is an aggregate summary statistic of how many people in each demographic the database proprietor measured, and how many of their impressions those people accounted for from the total which includes unknown audience members.

Examples disclosed herein determine demographic classifications for census-level impression counts and census-level audience sizes based on information collected by the database proprietor. As techniques described above rely on cookies, examples disclosed herein may not rely on cookies from database proprietors to determine demographic classifications for census-level impression counts and census-level audience sizes. Examples disclosed herein obtain the identification information for audience members and households that are collected by the database proprietor (e.g., a living unit identification (LUID) where a living unit represents an individual or group of people who reside together, which could be a traditional family or more expanded with people in the same house with different surnames (cohabitation, roommates, etc.)). In examples disclosed herein, the media consumed by the audience members include digital advertisement rating (DAR) tags (e.g., media tags) (e.g., Nielsen Digital Ad Ratings (DAR delivers deduplicated audience measurement metrics across computers, smartphones, tablets, and connected TV) that include identification information, such as, but not limited to, timestamp data, content identifiers, geographical location, identifiers unique to particular audience members, etc. Examples disclosed herein compare the identification information from the database proprietors with identifiers included in the media tags to identify the particular audience members. Examples disclosed herein reformat the media tags to append additional information to the media tag. Some examples disclosed herein encode features in the media tag for use in a machine learning model. In examples disclosed herein, the features include designated market area (DMA) data (e.g., a geographic area where residents can receive the same local TV stations, radio stations, and online content; it can be referred to as TV markets, broadcast markets, and media markets), the media device type, the daypart data (e.g., the process of dividing the television broadcast day into different blocks of time, or parts, and adjusting advertising strategy based on programming and demographics of viewers), and household demographics from the database proprietor. Examples disclosed herein generate a machine learning model (e.g., a viewer assignment model) to determine probabilities of different demographic categories for the census-level impression counts and census-level audience sizes. In examples disclosed herein, the machine learning model can be any type of machine learning model (e.g., light GBM, XGBoost, etc.). Examples disclosed herein obtain streaming meter data collected by a streaming media meter that capture streaming events from panel households. Some examples disclosed herein obtain content information (e.g., information contained within communication media, including internet, cinema, TV, radio, audio, and is directed at an end-user or audience in the sectors of publishing, art, and communication) to complete the streaming meter data from the streaming media meter. Examples disclosed herein use the content information and streaming meter data to train the machine learning model.

Examples disclosed herein run the machine learning model for impressions collected by the AME. In examples disclosed herein, the machine learning model outputs probabilities that the census-level impressions are included in given demographic categories and combinations of such demographic categories (e.g., female, male, ages 18-24, female and ages 18-24, etc.). In examples disclosed herein, there are 120 different demographic categories and combinations, however any number of demographic categories and combinations can be used. In some examples, if the machine learning determines a highest probability for a census-level impression is a combination of 3 or more demographic categories, then examples disclosed herein compare the probabilities of the available demographic categories to select the three or more demographic categories with the highest probabilities. Examples disclosed herein determine the demographic category or demographic combination with the highest probability for each census-level impression to select the demographic classification for the census-level impressions. In some examples, the machine learning model includes a target distribution of demographics. In such examples, the machine learning model determines probabilities for each of the demographic categories and combinations that will satisfy the target distribution of demographics for the census-level impression counts and census-level audience sizes.

Examples disclosed herein determine the demographic classifications for the census-level impression counts and census-level audience sizes based on the machine learning model output. In some examples, examples disclosed herein also scale the demographic classifications to account for non-covered impression counts (e.g., impression counts not associated with identification information from the database proprietor). Examples disclosed herein are able to determine demographic classifications for the census-level impression counts and census-level audience sizes without prior demographics information from the database proprietor. Examples disclosed herein determines the demographic classification using the machine learning model without requiring comprehensive streaming media data from the AME.

FIG. 1 illustrates an example operating environment 100 that includes an example audience measurement entity (AME) 102, an example database proprietor A 106, and example client devices 108. The example AME 102 includes an example AME computer 110 that implements example audience metrics generator circuitry 112 to estimate total unique audience sizes based on census-level media impressions logged by the AME 102 and/or census-level total audience sizes logged by the AME 102 and based on database proprietor (DBP) aggregate subscriber-based audience metrics information provided by the database proprietor 106. In examples disclosed herein, the audience metrics generator circuitry 112 determines demographic classifications for census-level media impressions. In the illustrated example of FIG. 1, the AME computer 110 may also implement an impression monitor system to log media impressions reported by the client devices 108. In the illustrated example of FIG. 1, the client devices 108 may be stationary or portable computers, handheld computing devices, smart phones, Internet appliances, and/or any other type of device that may be connected to the Internet and capable of presenting media.

As used herein, an audience size is defined as a number of deduplicated or unique audience members exposed to a media item of interest for audience metrics analysis. A deduplicated or unique audience member is one that is counted only once as part of an audience size. Thus, regardless of whether a particular person is detected as accessing a media item once or multiple times, that person is only counted once in the audience size for that media item. Audience size may also be referred to as unique audience or deduplicated audience.

As used herein, a media impression is defined as an occurrence of access and/or exposure to media 114 (e.g., an advertisement, a movie, a movie trailer, a song, a web page banner, a webpage, etc.). Examples disclosed herein may be used to monitor for media impressions of any one or more media types (e.g., video, audio, a webpage, an image, text, etc.). In examples disclosed herein, the media 114 may be content and/or advertisements. Examples disclosed herein are not restricted for use with any particular type of media. On the contrary, examples disclosed herein may be implemented in connection with tracking impressions for media of any type or form.

In the illustrated example of FIG. 1, content providers and/or advertisers distribute the media 114 via the Internet to users that access websites and/or online television services (e.g., web-based TV, Internet protocol TV (IPTV), etc.). In some examples, the media 114 is served by media servers of the same internet domains as the database proprietor 106. For example, the database proprietor 106 includes a database proprietor server 118 that can serve media 114 to its corresponding subscribers via the client devices 108. Examples disclosed herein can be used to generate audience metrics data that measures audience sizes of media served by the database proprietor 106 and/or any other entity. For example, the database proprietor 106 may use such audience metrics data to promote its online media serving services (e.g., ad server services, media server services, etc.) to prospective clients. By showing audience metrics data indicative of audience sizes drawn by the database proprietor 106, the database proprietor 106 can sell its media serving services to customers interested in delivering online media to users.

The media 114 is then presented via the client devices 108. When the media 114 is accessed by the client devices 108, the client devices 108 send impression requests 122a to the database proprietor server 118 to inform the database proprietor server 118 of the media accesses. In this manner, the database proprietor server 118 can log media impressions in impression records of a database proprietor audience metrics database 124. In some examples, the client devices 108 also send impression requests 122b to the AME 102 so that the AME 102 can log census impressions in an AME audience metrics database 126. In the illustrated example of FIG. 1, the database proprietor 106 logs demographic impressions corresponding to accesses by the client devices 108 to the media 114. Demographic impressions are impressions logged in association with demographic information collected by the database proprietor 106 from registered subscribers of its services. Also, in the illustrated example of FIG. 1, the AME computer 110 logs census-level media impressions corresponding to accesses by client devices 108 to media 114. Census-level media impressions (e.g., census impressions) are impressions logged regardless of whether demographic information is known for those logged impressions. In some examples, the AME computer 110 also logs census-level audience size(s) corresponding to accesses by client device 108 to media 114. A census-level audience size (e.g., census audiences) indicates a quantity of audience members attributable to the census impressions regardless of whether demographic information is known for those audience members. In some examples, the AME computer 110 deduplicates the census-level audience size (e.g., an audience member corresponding to multiple impressions in the census impressions is counted only once in the census-level audience size regardless of the number of impressions attributable to that audience member).

In some examples, the media 114 is encoded to include a media identifier (ID). The media ID may be any identifier or information that can be used to identify the corresponding media 114. In some examples the media ID is an alphanumeric string or value. In some examples, the media ID is a collection of information. For example, if the media 114 is an episode, the media ID may include program name, season number, and episode number. When the media 114 includes advertisements, such advertisements may be content and/or advertisements. The advertisements may be individual, standalone advertisements and/or may be part of one or more ad campaigns. The advertisements of the illustrated example are encoded with identification codes (e.g., data) that identify the associated ad campaign (e.g., campaign ID, if any), a creative type ID (e.g., identifying a Flash-based ad, a banner ad, a rich type ad, etc.), a source ID (e.g., identifying the ad publisher), and/or a placement ID (e.g., identifying the physical placement of the ad on a screen). In some examples, advertisements tagged with the monitoring instructions are distributed with Internet-based media content such as, for example, web pages, streaming video, streaming audio, IPTV content, etc. As noted above, methods, apparatus, systems, and/or articles of manufacture disclosed herein are not limited to advertisement monitoring but can be adapted to any type of media monitoring (e.g., web pages, movies, television programs, etc.).

In some examples, the media 114 of the illustrated example is tagged or encoded to include monitoring instructions or tag instructions, which are computer executable instructions (e.g., Java, java script, or any other computer language or script) that are executed by web browsers that access the media 114 via, for example, the Internet. Execution of the monitoring instructions causes the web browser to send the impression requests 122a,b (e.g., also referred to as tag requests) to one or more specified servers of the AME 102 and/or the database proprietor 106. As used herein, tag requests 122a,b are used by the client devices 108 to report occurrences of media impressions caused by the client devices 108 accessing the media 114. In the illustrated example, the tag requests 122a include user-identifying information that the database proprietor 106 can use to identify the subscriber that accessed the media 114. For example, when a subscriber of the database proprietor 106 logs into a server of the database proprietor 106 via a client device 108, that server of the database proprietor 106 sets a database proprietor cookie on the client device 108 and maps that cookie to the subscriber's identity/account information at the database proprietor server 118. In examples disclosed herein, subscriber identity and/or subscriber account information includes personally identifiable information (PII) such as full name, street address, residence city and state, telephone numbers, email addresses, ages, dates of birth, social security numbers, demographic information, and/or any other personal information provided by subscribers in exchange for services from the database proprietor 106. By having such PII information mapped to database proprietor cookies, the database proprietor 106 can subsequently identify the subscriber based on the database proprietor cookie to determine when that user accessed different media 114 and to log an impression in association with demographics and/or other PII information of that user. In the illustrated example of FIG. 1, the impression requests 122a include database proprietor cookies of the client devices 108 to inform the database proprietor 106 of the particular subscribers that accessed the media 114. In some examples, the AME 102 also sets AME cookies in the client devices 108 to identify users that are enrolled in an AME panel of the AME 102 such that the AME 102 collects PII information of people (e.g., members) that enroll in the panel by agreeing to having their internet activities monitored by the AME 102.

The tag requests 122a,b may be implemented using HTTP requests. However, whereas HTTP requests are network communications that traditionally identify web pages or other resources to be downloaded, the tag requests 122a,b of the illustrated example are network communications that include audience measurement information (e.g., ad campaign identification, media identifier, and/or user identification information) as their payloads. The server (e.g., the AME computer 110 and/or the database proprietor server 118) to which the tag requests 122a,b are directed is programmed to log occurrences of impressions reported by the tag requests 122a,b.

In other examples in which the media 114 is accessed by apps on mobile devices, tablets, computers, etc. (e.g., that do not employ cookies and/or do not execute instructions in a web browser environment), an app publisher (e.g., an app store) can provide a data collector (e.g., a software program or library to collect data) in an install package of an app for installation at the client devices 108. When a client device 108 downloads the app and consents to the accompanying data collector being installed at the client device 108 for purposes of audience/media/data analytics, the data collector can detect when the media 114 is accessed at the client device 108 and causes the client device 108 to send one or more of the impression requests 122a,b to report the access to the media 114. In such examples, the data collector can obtain user identifiers and/or device identifiers stored in the client devices 108 and send them in the impression requests 122a,b to enable the database proprietor 106 and/or the AME 102 to log impressions.

In the illustrated example, the database proprietor 106 collaborates with the AME 102 so that the AME 102 can operate as an independent party that measures and/or verifies audience measurement information pertaining to the media 114 accessed by the subscribers of the database proprietor 106. However, the database proprietor 106 does so while protecting the privacies of its subscribers by not sharing or revealing subscriber identities, subscriber information, and/or any other subscriber PII information to outside parties. In examples disclosed herein, to share impression data with the AME 102 without revealing subscriber identities, subscriber information, and/or any other subscriber PII information, the database proprietor 106 processes its collected subscriber-level audience metrics information to generate database proprietor aggregate subscriber-based audience metrics information. In the example of FIG. 1, database proprietor aggregate subscriber-based audience metrics information is shown as example database proprietor subscriber impression counts data 132 and example database proprietor subscriber audience sizes data 134. The example database proprietor subscriber impression counts data 132 includes impression counts in the aggregate (e.g., no user-identifying PII data) per demographic category (e.g., a demographic group) for one or more media items of interest. The example database proprietor subscriber audience sizes data 134 includes unique audience sizes in the aggregate (e.g., no user-identifying PII data) per demographic category for one or more media items of interest.

Figure 2:
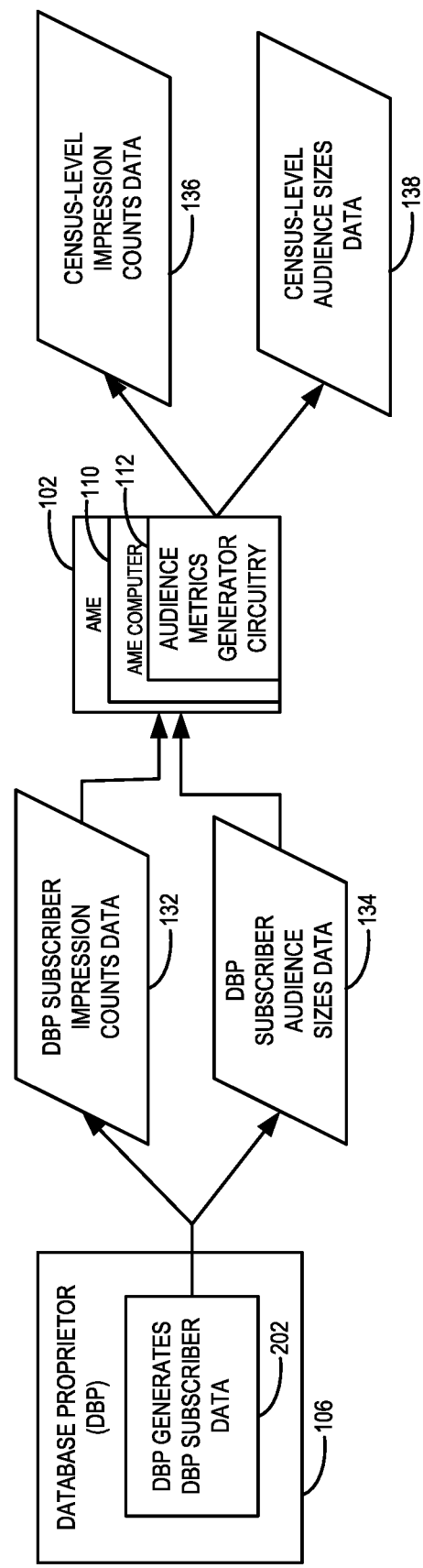
FIG. 2 is a schematic illustration of an example process flow of a database proprietor and an audience measurement entity to determine demographic classifications for census level impression counts and unique audience sizes based on subscriber impression count data and subscriber unique audience size data.

FIG. 2 is an example process flow of the database proprietor 106 and the AME 102 to estimate census-level impression counts and census-level unique audience sizes for media across multiple demographic categories based on the database proprietor subscriber impression counts data 132 and the database proprietor subscriber audience sizes data 134. The example process flow of FIG. 2 begins when the database proprietor 106 generates database proprietor subscriber-level audience metrics data 202 based on logging impressions of the media 114 (FIG. 1) accessed by subscribers of the database proprietor 106. The example database proprietor 106 then anonymizes the subscriber-level audience metrics data 202 by aggregating it by demographic category to generate the database proprietor subscriber impression counts data 132 and the database proprietor subscriber audience sizes data 134. In this example, the database proprietor 106 sends the database proprietor subscriber impression counts data 132 and the database proprietor subscriber audience sizes data 134 to the example audience metrics generator circuitry 112 of the AME 102. The example audience metrics generator circuitry 112 utilizes the database proprietor subscriber impression counts data 132 and the database proprietor subscriber audience sizes data 134 to determine demographic classifications for census-level impression counts data 136 and census-level audience sizes data 138.

Figure 3:
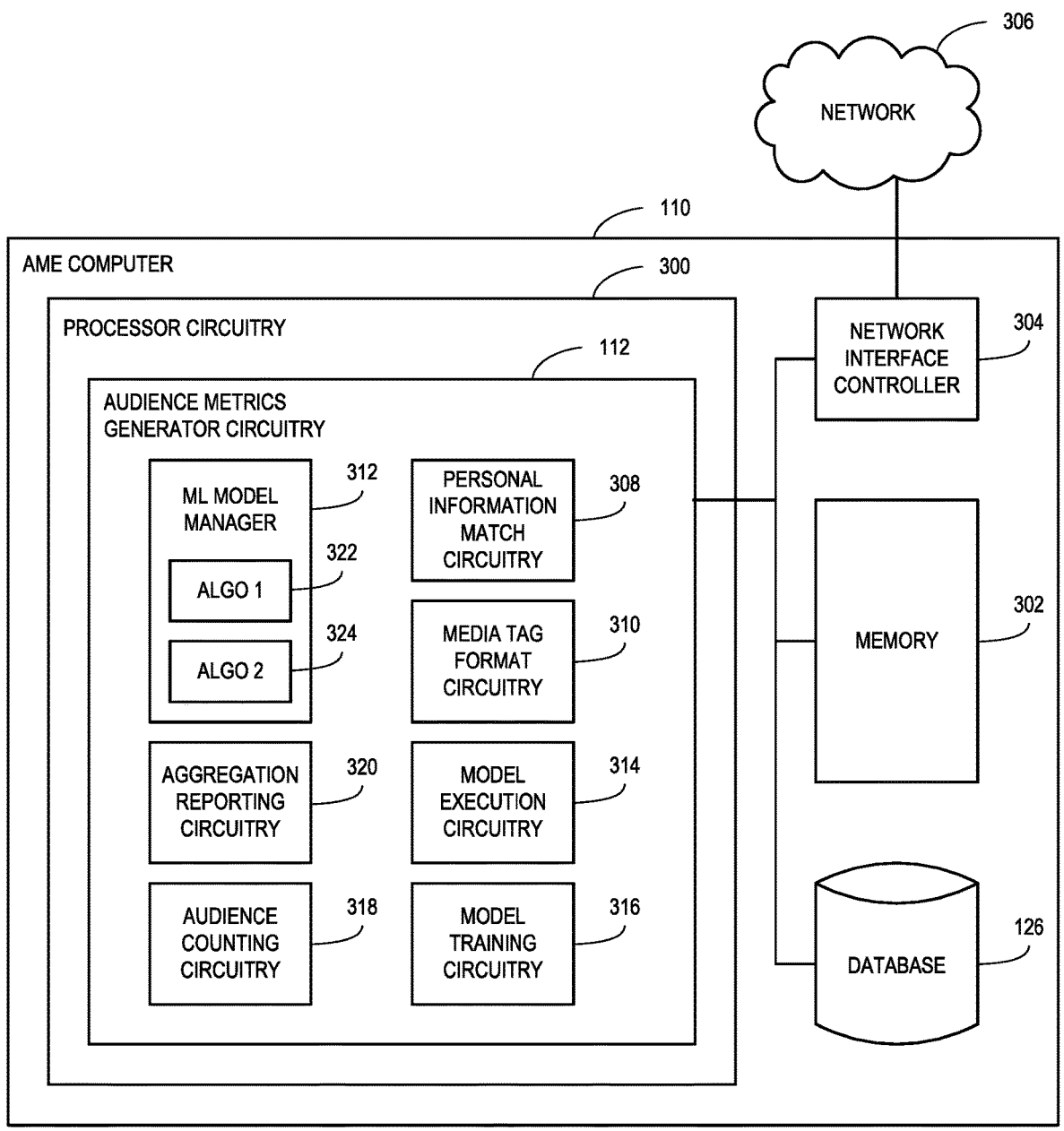
FIG. 3 is a block diagram of an audience metrics generator circuitry to determine demographic classifications for census level impression counts and unique audience sizes.

FIG. 3 is a block diagram of example audience metrics generator circuitry 112 to determine demographic classifications for census level impression counts and unique audience sizes. In some examples, the audience metrics generator circuitry 112 is included within the AME computer 110 (FIG. 1). In the illustrated example of FIG. 3, the AME computer includes example processor circuitry 300, example memory 302, an example network interface controller 304 that communicatively couples the AME computer 110 to an example network 306, and the database 126 (FIG. 1).

The example audience metrics generator circuitry 112 of FIG. 1 may be instantiated (e.g., creating an instance of, bring into being for any length of time, materialize, implement, etc.) by processor circuitry 300 such as a central processing unit executing instructions. Additionally or alternatively, the audience metrics generator circuitry 112 of FIG. 1 may be instantiated (e.g., creating an instance of, bring into being for any length of time, materialize, implement, etc.) by an ASIC or an FPGA structured to perform operations corresponding to the instructions.

In different examples, the memory 302 can be physical memory that could include volatile memory (e.g., dynamic random access memory (DRAM), static random access memory (SRAM, etc.), non-volatile memory, buffer memory within processor circuitry, a cache memory, or any one or more other types of memory. In different examples, the network interface controller 304 can include a transmitter, a receiver, a transceiver, a modem, and/or another type of network interface to facilitate exchange of data with external machines (e.g., computing devices of any kind) by network 306. In some examples, the database 126 may be stored in a mass storage device such as a hard disk drive (HDD), a solid state drive (SSD), and/or one or more other types of mass storage devices.

In the illustrated example in FIG. 3, the audience metrics generator circuitry 112 includes example personal information match circuitry 308, example media tag format circuitry 310, example machine learning (ML) model manager circuitry 312, example model execution circuitry 314, example model training circuitry 316, example audience counting circuitry 318, and example aggregation reporting circuitry 320. It should be understood that some or all of the circuitry of FIG. 3 may, thus, be instantiated at the same or different times. Some or all of the circuitry may be instantiated, for example, in one or more threads executing concurrently on hardware and/or in series on hardware. Moreover, in some examples, some or all of the circuitry of FIG. 3 may be implemented by one or more virtual machines and/or containers executing on the microprocessor.

In some examples, artificial intelligence (AI), including machine learning (ML) and/or other artificial machine-driven logic, enables machines (e.g., computers, logic circuits, etc.) to use a model to process input data to generate an output based on patterns and/or associations previously learned by the model via a training process. For instance, one(s) of algorithms (e.g., 322, 324) may be trained with data to recognize patterns and/or associations and follow such patterns and/or associations when processing input data such that other input(s) result in output(s) consistent with the recognized patterns and/or associations.

In some examples, implementing an AI/ML system involves two phases, a learning/training phase and an inference phase. In the learning/training phase, a training algorithm is used to train the one(s) of the algorithms 322, 324 to operate in accordance with patterns and/or associations based on, for example, training data. In some examples, the one(s) of the algorithms 322, 324 include(s) internal parameters (e.g., indices, raw data, metadata, insights, models, weights, biases, etc.) that guide how input data is transformed into output data, such as through a series of nodes and connections within the one(s) of the algorithms 322, 324 to transform input data into output data. Additionally, hyper-parameters are used as part of the training process to control how the learning is performed (e.g., a learning rate, a number of layers to be used in the machine learning model, etc.). Hyperparameters are defined to be training parameters that are determined prior to initiating the training process.

Once training is complete, the one(s) of the algorithms 322, 324 may be deployed for use as an executable construct that processes an input and provides an output based on the network of connections defined in the one(s) of the algorithms 322, 324. Once trained, the deployed one(s) of the algorithms 322, 324 may be operated in an inference phase to process data. In the inference phase, data to be analyzed (e.g., impression requests that may or may not also be related to panel members) is input to the one(s) of the algorithms 322, 324, and the one(s) of the algorithms 322, 324 execute(s) to create outputs. This inference phase can be thought of as the AI "thinking" to generate the output based on what it learned from the training (e.g., by executing the one(s) of the algorithms 322, 324 to apply the learned patterns and/or associations to the input data). In some examples, input data undergoes pre-processing before being used as an input to the one(s) of the algorithms 322, 324. Moreover, in some examples, the output data may undergo post-processing after it is generated by the one(s) of the algorithms 322, 324 to transform the output into a useful result (e.g., a display/report/tracking of demographic classification predictions, etc.).

In some examples, output of the deployed one(s) of the algorithms 322, 324 may be captured and provided as feedback. By analyzing the feedback, an accuracy of the deployed one(s) of the algorithm(s) 322, 324 can be determined. If the feedback indicates that the accuracy of the deployed model is less than a threshold or other criterion, training of an updated model can be triggered using the feedback and an updated training data set, updated features, etc., to generate an updated, deployed model.

In the illustrated example of FIG. 3, the audience metrics generator circuitry 112 includes the personal information match circuitry 308. In some examples, the personal information match circuitry 308 is instantiated by processor circuitry executing personal information match instructions and/or configured to perform operations such as those represented by the flowchart of FIG. 5.

The example personal information match circuitry 308 obtains an impression request and determines media tag data from within the impression request. As previously described, an example impression request is utilized to send monitoring information by a client device to a database proprietor (106 in FIG. 1) and/or an AME 102. The example impression request includes a reporting of an occurrence of a media impression at the client device. For example, the impression request includes information to report access to a particular item of media (e.g., an advertisement, a webpage, an image, video, audio, etc.). In some examples, the impression request includes a media tag and the media tag includes identification information, such as, but not limited to, timestamp data, content identifiers, geographical location, identifiers unique to particular audience members, etc. The example personal information match circuitry 308 parses/extracts the identification information from the media tag. For example, the personal information match circuitry 308 may gather identification information related to a specific person living in a household associated with the client device 108 that sends the impression request.

In some examples, the database proprietor subscriber personal information is kept private, thus the AME computer 110 may parse non-personal data from the media tag. In some examples, the AME computer 110 may have an exception to allow it to parse personal identification information from a media tag if the person identified by the media tag is a member that has enrolled in an audience panel which has an agreement to having internet activities and other media viewing activities monitored by the AME 102. In some examples, the personal information in the media tag might be a membership number that corresponds to personal identification information (e.g., name, address, phone number, etc.) stored in at least the database proprietor's database. Thus, the example personal information match circuitry 308 may cross-reference such a membership number with whether that person is also a member of the AME audience panel and only access such personal identification information if the person is a member of the audience panel.

In some examples, the audience metrics generator circuitry 112 includes means for matching identification data in a media tag with personal information in a database. For example, the means for matching may be implemented by personal information match circuitry 308. In some examples, the personal information match circuitry 308 may be instantiated by processor circuitry such as the example processor circuitry 1012 of FIG. 10. For instance, the personal information match circuitry 308 may be instantiated by the example microprocessor 1100 of FIG. 11 executing machine executable instructions such as those implemented by at least blocks 502 of FIG. 5. In some examples, the personal information match circuitry 308 may be instantiated by hardware logic circuitry, which may be implemented by an ASIC, XPU, or the FPGA circuitry 1200 of FIG. 12 structured to perform operations corresponding to the machine readable instructions. Additionally or alternatively, the personal information match circuitry 308 may be instantiated by any other combination of hardware, software, and/or firmware. For example, the personal information match circuitry 308 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

In the illustrated example of FIG. 3, the audience metrics generator circuitry 112 includes the media tag format circuitry 310. In some examples, the media tag format circuitry 310 is instantiated by processor circuitry executing media tag format instructions and/or configured to perform operations such as those represented by the flowcharts of FIGS. 5 and 7.

In some examples, the media tag format circuitry 310 creates a reformatted media tag within the impression requests 122b to append additional information to the media tag. In some examples, the media tag format circuitry 310 encodes features in the media tag for use in a machine learning model. For example, the features in the media tag may be used as input parameters in the machine learning model. In some examples, the features include one or more of DMA data, the media device type of the client device 108 that sends the impression request 122b, daypart data, household demographics from the database proprietor, and/or other relevant information.

The example media tag format circuitry 310 may perform pre-processing of the input data before being used as an input to the one(s) of the algorithms 322, 324. In some examples, the media tag is reformatted to provide the machine learning model a format that is digestible as input. In some examples, once the media tag has been reformatted and/or appended with features, then the media tag format circuitry 310 inputs the reformatted media tag into the machine learning model. The example media tag format circuitry 310 may input a reformatted media tag into the machine learning model during a training phase of the machine learning model, during an inference phase of the machine learning model, or during both the training and inference phases.

In some examples, the audience metrics generator circuitry 112 includes means for reformatting the media tag for a machine learning model. For example, the means for reformatting may be implemented by media tag format circuitry 310. In some examples, the media tag format circuitry 310 may be instantiated by processor circuitry such as the example processor circuitry 1012 of FIG. 10. For instance, the media tag format circuitry 310 may be instantiated by the example microprocessor 1100 of FIG. 11 executing machine executable instructions such as those implemented by at least blocks 504 of FIGS. 5 and 702, 704, and 706 of FIG. 7. In some examples, the media tag format circuitry 310 may be instantiated by hardware logic circuitry, which may be implemented by an ASIC, XPU, or the FPGA circuitry 1200 of FIG. 12 structured to perform operations corresponding to the machine readable instructions. Additionally or alternatively, the media tag format circuitry 310 may be instantiated by any other combination of hardware, software, and/or firmware. For example, the media tag format circuitry 310 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

In some examples, the means for reformatting includes means for appending features to the reformatted media tag.

In some examples, the means for reformatting includes means for inputting the reformatted media tag into the machine learning model In the illustrated example of FIG. 3, the audience metrics generator circuitry 112 includes the machine learning model manager circuitry 312. In some examples, the machine learning model manager circuitry 312 is instantiated by processor circuitry executing machine learning model manager instructions and/or configured to perform operations such as those represented by the flowchart of FIG. 5. Many different types of machine-learning models and/or machine-learning architectures exist. In some examples, the machine learning model manager circuitry 312 may generate one(s) of algorithms (e.g., algorithm 1 (322), algorithm 2 (324)) as machine learning model(s). In some examples, the machine learning model manager circuitry 312 can generate one(s) of the algorithms by selecting a type of model to start with, such as LightGBM (Light Gradient Boosting Machine), XGBoost (Extreme Gradient Boost), and/or one or more other models to perform assigned tasks.

In the illustrated example of FIG. 3, the audience metrics generator circuitry 112 includes the model execution circuitry 314. In some examples, the model execution circuitry 314 is instantiated by processor circuitry executing model execution instructions and/or configured to perform operations such as those represented by the flowchart of FIG. 5.

In some examples, the model execution circuitry 314 may operate the deployed one(s) of the algorithms 322, 324 in an inference phase to process data. In the inference phase, the impression requests 122b and the media tags within the impression requests 122b are input to the one(s) of the algorithms 322, 324, and the model execution circuitry 314 executes the one(s) of the algorithms 322, 324 execute(s) to create outputs. The example model execution circuitry 314, therefore, obtains the reformatted media tags and appended data to the reformatted media tags as input data from the media tag format circuitry 310, executes the machine learning model based on the one(s) of algorithms 322, 324 and creates outputs in the form of probabilities of occurrences of demographic classifications of audience members who have viewed the media (e.g., see FIG. 4 for an example set of probability outputs). In some examples, the model execution circuitry 314 also may use the database proprietor impression counts data 132 and/or the database subscriber audience sizes data 134 as input data. Although, in other examples, the database proprietor impression counts data 132 and/or the database subscriber audience sizes data 134 is instead utilized by the audience counting circuitry 318 during a post-processing phase of the output data.

In some examples, the audience metrics generator circuitry 112 includes means for executing a machine learning model. For example, the means for executing may be implemented by model execution circuitry 314. In some examples, the model execution circuitry 314 may be instantiated by processor circuitry such as the example processor circuitry 1012 of FIG. 10. For instance, the model execution circuitry 314 may be instantiated by the example microprocessor 1100 of FIG. 11 executing machine executable instructions such as those implemented by at least block 506 of FIG. 5. In some examples, the model execution circuitry 314 may be instantiated by hardware logic circuitry, which may be implemented by an ASIC, XPU, or the FPGA circuitry 1200 of FIG. 12 structured to perform operations corresponding to the machine readable instructions. Additionally or alternatively, the model execution circuitry 314 may be instantiated by any other combination of hardware, software, and/or firmware. For example, the model execution circuitry 314 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

In the illustrated example of FIG. 3, the audience metrics generator circuitry 112 includes the model training circuitry 314. In some examples, the model training circuitry 314 is instantiated by processor circuitry executing model training instructions and/or configured to perform operations such as those represented by the flowchart of FIG. 5.

Different types of training may be performed based on the type of machine learning model and/or the expected output. For example, the model training circuitry 316 may invoke supervised training to use inputs and corresponding expected (e.g., labeled) outputs to select parameters (e.g., by iterating over combinations of selected parameters) for the one(s) of the algorithms 322, 324 that reduce model error. As used herein, "labeling" refers to an expected output of the machine learning model (e.g., a classification, an expected output value, etc.).

In some examples, the model training circuitry 316 may train the one(s) of the algorithms 322, 324 until a level of model error is no longer reducing. In some examples, the model training circuitry 316 may train the one(s) of the algorithms 322, 324 locally on the AME computer 110 and/or remotely at an external computing system (e.g., on external computing device(s) in communication with the AME computer 110 and communicatively coupled to the model training circuitry 316. In some examples, the model training circuitry 316 trains the one(s) of the algorithms 322, 324 using weights and biases to adjust for model error. In some examples, the model training circuitry 316 may perform re-training. The model training circuitry 316 may execute such re-training in response to an override by a user of the AME computer 110, a receipt of new training data, etc.

In some examples, the model training circuitry 316 facilitates the training of the one(s) of the algorithms 322, 324 using training data. In some examples, the model training circuitry 316 utilizes training data that originates from client devices 108, such as from impression requests 122b. In some examples, the impression requests include both a reporting of an occurrence of a media impression at a client device 108 (e.g., information to report access to a particular item of media) as well as a media tag associated with the accessed media. The example media tag may include an ID (e.g., a personal identification number) of individual household members that have viewed the media (e.g., viewers). In some examples, the database proprietor 106 has personal identifiable information (e.g., name, physical address, phone number, age, email address, etc.) to match to each ID number for subscribers of its services. In some examples, the AME 102 (and AME computer 110) also has similar or the same personal identifiable information associated with the ID for viewers who are members of an audience member panel associated with the AME 102.

In some examples, the model training circuitry 316 trains the the one(s) of the algorithms 322, 324 using, as input, impression requests 122b received from the client devices 108 that are associated with viewers who are AME panel members (e.g., people who have agreed to allow their personal identifiable information to be known by the AME 102). The example model training circuitry 316 executes the machine learning model during training using such panel member impression requests without taking advantage of the accessible personal identifiable information within the media tags in those impression requests. In some examples, the data output from the executed machine learning model includes a list of probabilities per demographic classification, based on the impression request 122*b* inputs. For example, a demographic classification may be a category/label such as "Females between the ages of 18-20." The example outputs provide a list of probabilities, based on the input impression requests, of which demographic classifications have viewed the media 114 to provide a prediction of viewership. Then, the example model training circuitry 316 compares such probabilities against the actual personal identifiable information to verify accuracy of the model outputs. In some examples, the model training circuitry 316 adjusts weights and biases within the one(s) of the algorithms 322, 324 to improve the accuracy of the machine learning model. FIG. 4 illustrates an example of an array of probabilities with three demographic classifications (child "C" (ages 2-12), male "M" (ages 13+), and female "F" (ages 13+)). In the illustrated example of FIG. 4, the model outputs show the highest probability demographic classification of viewer is child only (at 0.89 likelihood) and the lowest probability demographic classification of viewer is male only (at 0.04 likelihood).

In some examples, for impression requests that are associated with subscribers to the database proprietor 106 services, the database proprietor 106 provides database proprietor subscriber impression counts data 132 and database proprietor subscriber audience sizes data 134 to the audience metrics generator circuitry 112. The example database proprietor subscriber impression counts data 132 includes impression counts in the aggregate (e.g., no personal identifiable information) per demographic classification (e.g., a demographic category/group) for one or more media items of interest. The example database proprietor subscriber audience sizes data 134 includes unique audience sizes in the aggregate (e.g., no personal identifiable information) per demographic category for one or more media items of interest associated with the media impressions 122*b*. In some examples, the model training circuitry 316 trains the one(s) of the algorithms 322, 324 with inputs that include one or more of the database proprietor subscriber impression counts data 132 and database proprietor subscriber audience sizes data 134 as training input to the machine learning model. In some examples, the model training circuitry 316 trains the one(s) of the algorithms 322, 324 with inputs that include one or more features related with the media items of interest that are associated with the media impressions 122*b*. For example, features from a feature set to be added to the training input may include designated market areas (DMA) data (e.g., a geographic area where residents can receive the same local TV stations, radio stations, and online content; it can be referred to as TV markets, broadcast markets, and media markets), the media device type (e.g., a smart TV, a laptop computer, a tablet, a phone, etc.), daypart data (e.g., the process of dividing the television broadcast day into different blocks of time, or parts), and/or household demographics from the database proprietor, etc.

The example model training circuitry 316 may mask training outputs of probabilities that are inconsistent with obtained database proprietor subscriber impression counts data 132 corresponding to the viewed media. For example, the obtained database proprietor subscriber impression counts data 132, though provided in the aggregate, may show that certain demographic classifications are not represented in general (e.g., there are zero Males represented between the ages of 55 and 64). Thus, in some examples, if the training outputs of the model show a non-zero probability of a demographic classification that does not exist in the aggregated data, that probability will be masked and instead show as a 0% chance (0.00) that there are 55-64 year old males represented in the model predictions of probabilities across the demographic classifications. In some examples, an inconsistency threshold is defined to compare the probability against. In some examples, an inconsistency threshold may involve a comparison of a model output probability to a known 0% chance of a non-represented demographic classification in the aggregate. Thus, if the model output for such a demographic classification is greater than zero, in some examples, the inconsistency threshold is satisfied (e.g., met) and the example model training circuitry 316 masks such probability output values. In some examples, the inconsistency threshold may be a value other than zero. For example, if a known aggregate demographic classification (e.g., children aged 2-12) includes a significant population of people (e.g., out of 10 total household audience members 60% are within the specific known demographic classification), then an inconsistency threshold may be determined as being set to 0.50. Thus, in such an example, a training output of the probability of children aged 2-12 demographic classification that is below 0.50 may satisfy an inconsistency threshold. In other words, the model is outputting too low of a value due to the known database proprietor subscriber audience size data 134 and the known database proprietor subscriber impression counts data 132.

In some examples where supervised training is used, the model training circuitry 316 may label the training data (e.g., label training data or portion(s) thereof with appropriate metadata, such as panel members impression requests). In some examples, the model training circuitry 316 may preprocess the training data. In some examples, the model training circuitry 316 sub-divides the training data into a first portion of data for training the one(s) of the algorithms 322, 324, and a second portion of data for validating the one(s) of the algorithms 322, 324.

In some examples, the audience metrics generator circuitry 112 includes means training a machine learning model. For example, the means for training may be implemented by model training circuitry 316. In some examples, the model training circuitry 316 may be instantiated by processor circuitry such as the example processor circuitry 1012 of FIG. 10. For instance, the model training circuitry 316 may be instantiated by the example microprocessor 1100 of FIG. 11 executing machine executable instructions such as those implemented by at least blocks 602, 604, 606, 608, 620, and 612 of FIG. 6. In some examples, the model training circuitry 316 may be instantiated by hardware logic circuitry, which may be implemented by an ASIC, XPU, or the FPGA circuitry 1200 of FIG. 12 structured to perform operations corresponding to the machine readable instructions. Additionally or alternatively, the model training circuitry 316 may be instantiated by any other combination of hardware, software, and/or firmware. For example, the model training circuitry 316 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

In some examples, the means for training includes means for determining if identification data in the media tag of an impression request matches panel member ID. In some examples, the means for training includes means for comparing the probability of the occurrence of a demographic classification value to known panel member demographics. In some examples, the means for training includes means for masking outputs of the machine learning model for inconsistent demographic classifications. In some examples, the means for training includes means for adjusting weights and/or biases of the machine learning model based on the comparison of the probability of occurrence of the demographic classification value to the known panel member demographics.

In the illustrated example of FIG. 3, the audience metrics generator circuitry 112 includes the audience counting circuitry 318. In some examples, the audience counting circuitry 318 is instantiated by processor circuitry executing audience counting instructions and/or configured to perform operations such as those represented by the flowcharts of FIGS. 5 and 8.

The example audience counting circuitry 318 may post-process the outputs of the machine learning model (e.g., the outputs of the one(s) of executed algorithms 322, 324) by assigning a unique audience count to demographic classifications based on outputs from the machine learning model. As used herein, a "unique audience count" refers to a deduplicated count of audience members (e.g., viewers) of a piece of media. In some examples, the unique audience count is for a specific group of audience members, such as the audience members in a household. In some examples, the unique audience count is for all known audience members that have viewed the media (e.g., across groups, across households, etc.). In some examples, the unique audience count may be divided into numbers of individuals across a set of demographic classifications. For example, the unique audience count for a household may be determined as two females between the ages of 18 to 20, one female between the ages of 45-54, and one male between the ages of 45-54. In different examples, there may be any number of demographic classifications that an audience group may be divided into. For example, there may be demographic classifications based on sex as well as on every year of age for human beings (e.g., 1 to 100+), and/or there may be a set of more general demographic classifications (e.g., children ages 2-12, females ages 13-19, males ages 13-19, females ages 20-29, males ages 20-29, and so on). In some examples, individual demographic classifications may also include coviewer classifications of two or more people in one classification (e.g., one male and one female ages 30-39).

To assign a unique audience count, the example audience counting circuitry 318 traverses (e.g., moves, navigates, etc.) through the outputs of the machine learning model and, for each demographic classification probability output, determines whether that output satisfies an occurrence threshold. For example, returning to FIG. 4, if the occurrence threshold is a 0.50 probability, then, assuming the FIG. 4 outputs shown are for a household, the audience counting circuitry 318 determines that the "C only" demographic (at 0.89 probability) and the "C& F" probability (at 0.67 probability) satisfy a 0.50 occurrence threshold for the household. In some examples, this means the audience counting circuitry 318 counts one child and one female as the unique audience members in the household. In some examples, the occurrence threshold may be a first order determination of unique audience members in the household, and a second order determination may then rank the probabilities and choose one over another based on higher probability if two demographic classifications are mutually exclusive (e.g., a C "only" classification indicates that no Fs are in the household, yet a C & F classification indicates that Fs are in the household).

In some examples, to determine a unique audience count, the audience counting circuitry 318 also uses as input for the determination one or more of the example database proprietor subscriber impression counts data 132 and/or the example database proprietor subscriber audience sizes data 134 obtained from the database proprietor 106. In such examples, the audience counting circuitry 318 may cross check the initial determination of one "C only" demographic classification count and one "C& F" demographic classification count against the example database proprietor subscriber impression counts data 132 and example database proprietor subscriber audience sizes data 134 to further specify the unique audience count for the household. For example, a 0.89 probability of a "C only" demographic classification occurrence and a 0.67 probability of a "C & F" demographic classification occurrence in the household may initially exhibit as conflicting data. But, for example, additional light may be shed on the determination if an obtained database proprietor subscriber impression count data 132 shows that there is one F in the household and/or an obtained database proprietor subscriber audience sizes data 134 shows that the household has 3 members. For example, such information may cause the audience counting circuitry 318 to determine the household has two Cs and one F, based on the probabilities illustrated in FIG. 4 as well as the database proprietor subscriber impression counts data 132 and the database proprietor subscriber audience sizes data 134.

In some examples, the audience counting circuitry 318 may apply one or more coviewing factor(s)s to the demographic classification probability values (e.g., from FIG. 4). For example, a coviewing factor may include probabilities of combination occurrence values (e.g., one male and one female ages 30-39). In some examples, a coviewing factor may include probability thresholds combined with obtained database proprietor subscriber audience sizes data 134. In some examples, a coviewing factor may include combinations of probabilities across demographic classifications that are all above a specific occurrence threshold value, indicating that multiple household viewers are present that are not duplicated (e.g., one male between the ages of 13-19 and one male between the ages of 40-49).

In some examples, by applying coviewing factor(s) and one or more of the database proprietor subscriber impression counts data 132 or the database proprietor subscriber audience sizes data 134, the audience counting circuitry 318 may also deduplicate multiple viewings of a piece of media by a single audience member in the household/group (e.g., only count the audience member as viewing the media once). In some examples, if the audience member is a member of an audience measurement panel that allows the AME computer access to specific audience member ID information for each media tag in each impression request 122b, then the audience counting circuitry 318 may verify unique audience members and deduplicate with no error additional viewings of the piece of media by a single audience member.

The example audience counting circuitry 318 increments a count of a given of a unique audience member in light of one or more of the demographic classification probabilities obtained from the machine learning model outputs, the database proprietor subscriber impression counts data 132, the database proprietor subscriber audience sizes data 134, and/or the coviewing factor(s). As described, in some examples, the example audience counting circuitry 318 traverses through each of the demographic classifications available and performs increments of counts per demographic classification. In some examples, performing increments of demographic classification counts through a traversal of the set of demographic classifications may be referred to as assigning a unique audience member count to each demographic classification based on at least the outputs of the machine learning model.

In some examples, the audience counting circuitry 318 may utilize the assigned unique audience member counts corresponding to the different demographic classifications to report out census-level impression counts data 136 and/or census-level audience sizes data 138 to one or more external entities (e.g., the database proprietor 106, a central audience measurement facility, etc.).

In some examples, the audience metrics generator circuitry 112 includes means for assigning unique audience member counts to demographic classifications. For example, the means for assigning may be implemented by audience counting circuitry 318. In some examples, the audience counting circuitry 318 may be instantiated by processor circuitry such as the example processor circuitry 1012 of FIG. 10. For instance, the audience counting circuitry 318 may be instantiated by the example microprocessor 1100 of FIG. 11 executing machine executable instructions such as those implemented by at least blocks 508 of FIG. 5 and blocks 802, 804, 806, 808, 810, 812, 814, and 816 of FIG. 8. In some examples, the audience counting circuitry 318 may be instantiated by hardware logic circuitry, which may be implemented by an ASIC, XPU, or the FPGA circuitry 1200 of FIG. 12 structured to perform operations corresponding to the machine readable instructions. Additionally or alternatively, the audience counting circuitry 318 may be instantiated by any other combination of hardware, software, and/or firmware. For example, the audience counting circuitry 318 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

In some examples, the means for assigning includes means for examining demographic classification probabilities from the machine learning model outputs. In some examples, the means for assigning includes means for determining if a demographic classification probability satisfies an occurrence threshold value. In some examples, the means for assigning includes means for applying a database proprietor subscriber impression counts data and/or a subscriber audience sizes data to a demographic classification probability. In some examples, the means for assigning includes means for applying coviewing factor(s) to a demographic classification probability. In some examples, the means for assigning includes means for incrementing a count of unique audience members representing the demographic classification probability. In some examples, the means for assigning includes means for determining if the entire set of outputs have been traversed.

In the illustrated example of FIG. 3, the audience metrics generator circuitry 112 includes aggregation reporting circuitry 320. In some examples, the aggregation reporting circuitry 320 is instantiated by processor circuitry executing aggregation reporting instructions and/or configured to perform operations such as those represented by the flowcharts of FIGS. 5 and 9.

The example aggregation reporting circuitry 320 may perform post-processing on the output data after it is generated by the one(s) of the algorithms 322, 324 to transform the output into a useful result (e.g., a display/report/tracking of demographic classification predictions, etc.). In some examples, the one(s) of algorithms 322, 324 are executed in the inference phase using the input of a group of audience members. In some examples, the audience members are grouped on a per household basis. In some examples, the audience members are grouped on another criteria, for example by zip code. In some examples, the group of audience members are the entire set of audience members and they are not subdivided by such grouping classifications as household, zip code, and/or another grouping.

In some examples, the aggregation reporting circuitry 320 aggregates the outputs of the machine learning model across groups. For example, if a group is based on a household location, then the aggregation reporting circuitry 320 may aggregate the outputs of the machine learning model across the represented households. In some examples, the aggregation reporting circuitry 320 aggregates assigned unique audience members counts obtained from the audience counting circuitry 318.

The example aggregation reporting circuitry 320 aggregates impression requests (including information about the identified media viewed from the impression requests) as well as the counts of unique audience members corresponding to the impression requests. Once such information is aggregated, the example aggregation reporting circuitry 320 may generate a report about the aggregated data. For example, for a given piece of media viewed (e.g., an advertisement, a segment of a streamed media program, etc.) the aggregation reporting circuitry 320 may generate a report of a distribution of the demographic classifications across groups of audience members and/or other distributions, such as across households. In some examples, the aggregation reporting circuitry 320 may calculate such distribution(s) and then provide a visual graph or other display of the distribution(s). For example, the aggregation reporting circuitry 320 may provide a report of audience member viewership of a specific program by each demographic classification, across households. In some examples, the aggregation reporting circuitry 320 updates census impression counts in the AME audience metrics database 126 using the generated report to increase the accuracy of the census impression counts when compared to an actual number of impression counts by subscribers/users of the client devices 108.

In some examples, the audience metrics generator circuitry 112 includes means generating a report of aggregated impressions and audience sizes. For example, the means for generating may be implemented by aggregation reporting circuitry 320. In some examples, the aggregation reporting circuitry 320 may be instantiated by processor circuitry such as the example processor circuitry 1012 of FIG. 10. For instance, the aggregation reporting circuitry 320 may be instantiated by the example microprocessor 1100 of FIG. 11 executing machine executable instructions such as those implemented by at least blocks 510 of FIGS. 5 and 902, 904, and 906 of FIG. 9. In some examples, the aggregation reporting circuitry 320 may be instantiated by hardware logic circuitry, which may be implemented by an ASIC, XPU, or the FPGA circuitry 1200 of FIG. 12 structured to perform operations corresponding to the machine readable instructions. Additionally or alternatively, the aggregation reporting circuitry 320 may be instantiated by any other combination of hardware, software, and/or firmware. For example, the aggregation reporting circuitry 320 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

In some examples, the means for generating includes means for aggregating impression requests and counts of unique audience members corresponding to the impression requests. In some examples, the means for generated includes means for updating census impression counts in an AME audience metrics database 126 using the generated report.

While an example manner of implementing the audience metrics generator circuitry 112 of FIG. 1 is illustrated in FIG. 3, one or more of the elements, processes, and/or devices illustrated in FIG. 3 may be combined, divided, re-arranged, omitted, eliminated, and/or implemented in any other way. Further, the example personal information match circuitry 308, the example media tag format circuitry 310, the example machine model manager 312, the example model execution circuitry 314, the example model training circuitry 316, the example audience counting circuitry 318, the example aggregation reporting circuitry 320, and/or, more generally, the example audience metrics generator circuitry 112 of FIG. 1, may be implemented by hardware alone or by hardware in combination with software and/or firmware. Thus, for example, any of the example personal information match circuitry 308, the example media tag format circuitry 310, the example machine model manager 312, the example model execution circuitry 314, the example model training circuitry 316, the example audience counting circuitry 318, the example aggregation reporting circuitry 320 and/or, more generally, the example audience metrics generator circuitry 112, could be implemented by processor circuitry, analog circuit(s), digital circuit(s), logic circuit(s), programmable processor(s), programmable microcontroller(s), graphics processing unit(s) (GPU(s)), digital signal processor(s) (DSP(s)), application specific integrated circuit(s) (ASIC(s)), programmable logic device(s) (PLD(s)), and/or field programmable logic device(s) (FPLD(s)) such as Field Programmable Gate Arrays (FPGAs). Further still, the example audience metrics generator circuitry 112 of FIG. 1 may include one or more elements, processes, and/or devices in addition to, or instead of, those illustrated in FIG. 3, and/or may include more than one of any or all of the illustrated elements, processes and devices.

Flowcharts representative of example hardware logic circuitry, machine readable instructions, hardware implemented state machines, and/or any combination thereof for implementing the audience metrics generator circuitry 112 of FIG. 3 are shown in FIGS. 5-9. The machine readable instructions may be one or more executable programs or portion(s) of an executable program for execution by processor circuitry, such as the processor circuitry 1012 shown in the example processor platform 1000 discussed below in connection with FIG. 10 and/or the example processor circuitry discussed below in connection with FIGS. 11 and/or 12. The program(s) may be embodied in software stored on one or more non-transitory computer readable storage media such as a compact disk (CD), a floppy disk, a hard disk drive (HDD), a solid-state drive (SSD), a digital versatile disk (DVD), a Blu-ray disk, a volatile memory (e.g., Random Access Memory (RAM) of any type, etc.), or a non-volatile memory (e.g., electrically erasable programmable read-only memory (EEPROM), FLASH memory, an HDD, an SSD, etc.) associated with processor circuitry located in one or more hardware devices, but the entire program(s) and/or parts thereof could alternatively be executed by one or more hardware devices other than the processor circuitry and/or embodied in firmware or dedicated hardware. The machine readable instructions may be distributed across multiple hardware devices and/or executed by two or more hardware devices (e.g., a server and a client hardware device). For example, the client hardware device may be implemented by an endpoint client hardware device (e.g., a hardware device associated with a user) or an intermediate client hardware device (e.g., a radio access network (RAN)) gateway that may facilitate communication between a server and an endpoint client hardware device). Similarly, the non-transitory computer readable storage media may include one or more mediums located in one or more hardware devices. Further, although the example program is described with reference to the flowcharts illustrated in FIGS. 5-9, many other methods of implementing the example audience metrics generator circuitry 112 may alternatively be used. For example, the order of execution of the blocks may be changed, and/or some of the blocks described may be changed, eliminated, or combined. Additionally or alternatively, any or all of the blocks may be implemented by one or more hardware circuits (e.g., processor circuitry, discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more hardware devices (e.g., a single-core processor (e.g., a single core central processor unit (CPU)), a multi-core processor (e.g., a multi-core CPU, an XPU, etc.) in a single machine, multiple processors distributed across multiple servers of a server rack, multiple processors distributed across one or more server racks, a CPU and/or a FPGA located in the same package (e.g., the same integrated circuit (IC) package or in two or more separate housings, etc.).

The machine readable instructions described herein may be stored in one or more of a compressed format, an encrypted format, a fragmented format, a compiled format, an executable format, a packaged format, etc. Machine readable instructions as described herein may be stored as data or a data structure (e.g., as portions of instructions, code, representations of code, etc.) that may be utilized to create, manufacture, and/or produce machine executable instructions. For example, the machine readable instructions may be fragmented and stored on one or more storage devices and/or computing devices (e.g., servers) located at the same or different locations of a network or collection of networks (e.g., in the cloud, in edge devices, etc.). The machine readable instructions may require one or more of installation, modification, adaptation, updating, combining, supplementing, configuring, decryption, decompression, unpacking, distribution, reassignment, compilation, etc., in order to make them directly readable, interpretable, and/or executable by a computing device and/or other machine. For example, the machine readable instructions may be stored in multiple parts, which are individually compressed, encrypted, and/or stored on separate computing devices, wherein the parts when decrypted, decompressed, and/or combined form a set of machine executable instructions that implement one or more operations that may together form a program such as that described herein.

In another example, the machine readable instructions may be stored in a state in which they may be read by processor circuitry, but require addition of a library (e.g., a dynamic link library (DLL)), a software development kit (SDK), an application programming interface (API), etc., in order to execute the machine readable instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, machine readable media, as used herein, may include machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example operations of FIGS. 5-9 may be implemented using executable instructions (e.g., computer and/or machine readable instructions) stored on one or more non-transitory computer and/or machine readable media such as optical storage devices, magnetic storage devices, an HDD, a flash memory, a read-only memory (ROM), a CD, a DVD, a cache, a RAM of any type, a register, and/or any other storage device or storage disk in which information is stored for any duration (e.g., for extended time periods, permanently, for brief instances, for temporarily buffering, and/or for caching of the information). As used herein, the terms non-transitory computer readable medium, non-transitory computer readable storage medium, non-transitory machine readable medium, and non-transitory machine readable storage medium are expressly defined to include any type of computer readable storage device and/or storage disk and to exclude propagating signals and to exclude transmission media. As used herein, the terms "computer readable storage device" and "machine readable storage device" are defined to include any physical (mechanical and/or electrical) structure to store information, but to exclude propagating signals and to exclude transmission media. Examples of computer readable storage devices and machine readable storage devices include random access memory of any type, read only memory of any type, solid state memory, flash memory, optical discs, magnetic disks, disk drives, and/or redundant array of independent disks (RAID) systems. As used herein, the term "device" refers to physical structure such as mechanical and/or electrical equipment, hardware, and/or circuitry that may or may not be configured by computer readable instructions, machine readable instructions, etc., and/or manufactured to execute computer readable instructions, machine readable instructions, etc.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, or (7) A with B and with C. As used herein in the context of describing structures, components, items, objects and/or things, the phrase "at least one of A and B" is intended to refer to implementations including any of (1) at least one A, (2) at least one B, or (3) at least one A and at least one B. Similarly, as used herein in the context of describing structures, components, items, objects and/or things, the phrase "at least one of A or B" is intended to refer to implementations including any of (1) at least one A, (2) at least one B, or (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, or (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, or (3) at least one A and at least one B.

As used herein, singular references (e.g., "a", "an", "first", "second", etc.) do not exclude a plurality. The term "a" or "an" object, as used herein, refers to one or more of that object. The terms "a" (or "an"), "one or more", and "at least one" are used interchangeably herein. Furthermore, although individually listed, a plurality of means, elements or method actions may be implemented by, e.g., the same entity or object. Additionally, although individual features may be included in different examples or claims, these may possibly be combined, and the inclusion in different examples or claims does not imply that a combination of features is not feasible and/or advantageous.

Figure 5:
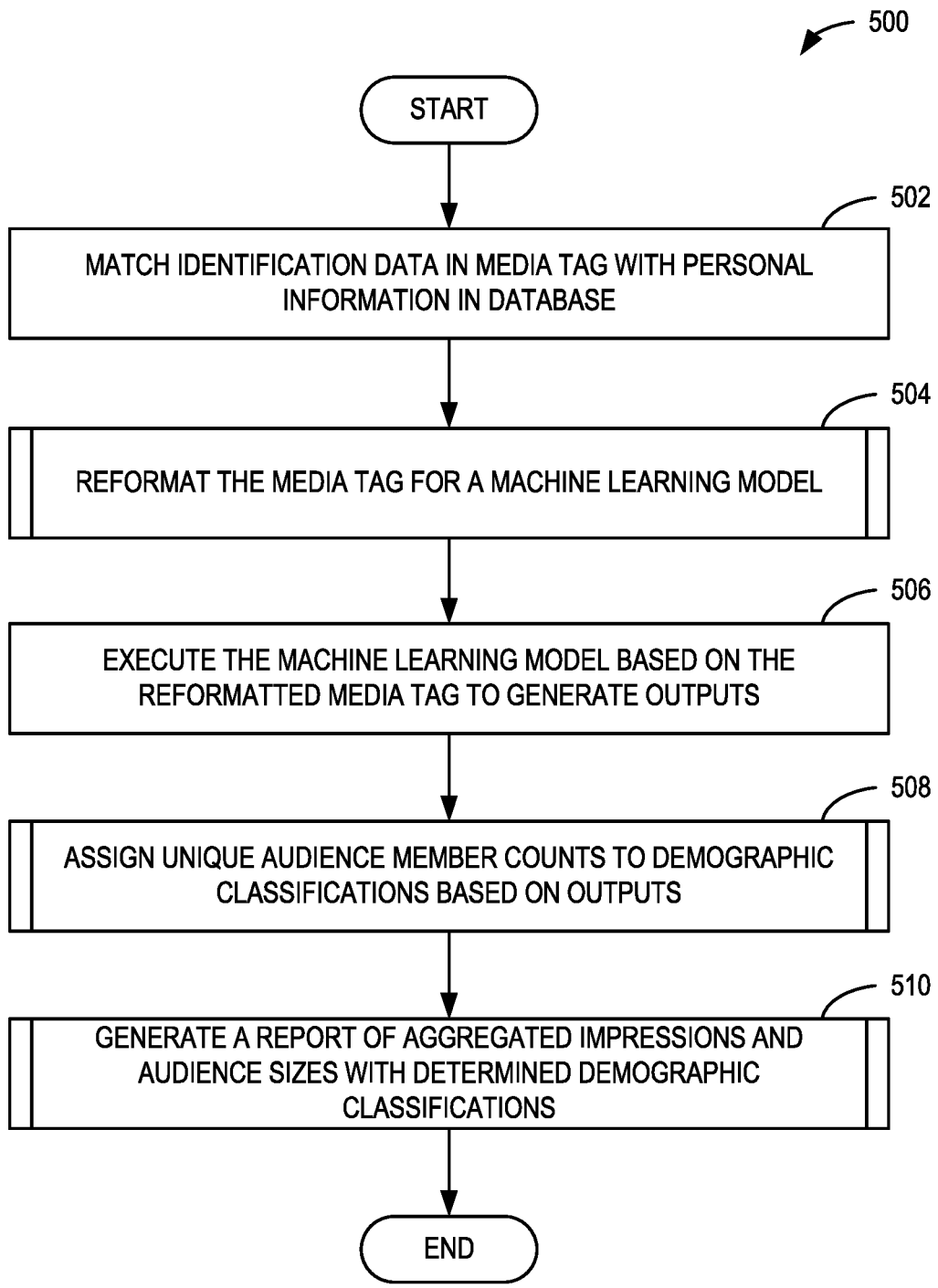
FIG. 5 is a flowchart representative of example machine readable instructions and/or example operations that may be executed and/or instantiated by processor circuitry to determine demographic classifications for census-level impression counts and unique audience sizes.

FIG. 5 is a flowchart representative of example machine readable instructions and/or example operations 500 that may be executed and/or instantiated by processor circuitry to determine demographic classifications for census-level impression counts and unique audience sizes. The machine readable instructions and/or the operations 500 of FIG. 5 begin at block 502, at which the example personal information match circuitry 308 matches identification data in a media tag with personal information in a database. In some examples, the example personal information match circuitry 308 is instantiated within the AME computer 110 in FIGS. 1, 2, and 3.

At block 504, the example media tag format circuitry 310 reformats the media tag for a machine learning model. For example, a media tag within an impression request 122*b* obtained from a client device 108 may include identification data associated with the audience member that initiated the impression request 122*b* by viewing media (e.g., 114) on a client device 108. The example media tag with the identification data may be reformatted to adapt as input data for the machine learning model (e.g., the one(s) of algorithms 322, 324 executed as a machine learning model). An example process that may be executed and/or instantiated by processor circuitry to implement block 504 is described below in connection with FIG. 7.

At block 506, the example model execution circuitry 314 executes the machine learning model based on the reformatted media tag to generate outputs. For example, the model execution circuitry 314 may operate a machine learning model executable deployed as one(s) of the algorithms 322, 324 after a training phase. In some examples, the model execution circuitry 314 may obtain a selection of the specific algorithm (e.g., 322, 324, or one or more other algorithms) to execute from the machine learning model manager 312. In some examples, the result of the execution of such algorithm is an output of probabilities of one(s) of demographic classifications (see FIG. 4 for an example set of probability outputs corresponding to individual demographic classifications).

At block 508, the example audience counting circuitry 318 assigns unique audience member counts to demographic classifications based on the outputs obtained from the executed machine learning model (e.g., the executed algorithm 322, 324). For example, the audience counting circuitry 318 may determine a count of each demographic classification using probabilities of outputs from the machine learning model and comparing the probabilities to one or more occurrence threshold values. An example process that may be executed and/or instantiated by processor circuitry to implement block 508 is described below in connection with FIG. 8.

At block 510, the example aggregation reporting circuitry 320 generates a report of aggregated impressions and audience sizes. For example, the aggregation reporting circuitry 320 may provide a report that illustrates the distribution of demographic classifications across the entire viewer audience for a given piece of media. An example process that may be executed and/or instantiated by processor circuitry to implement block 510 is described below in connection with FIG. 9. After block 510, the example instructions/operations 500 end.

Figure 6:
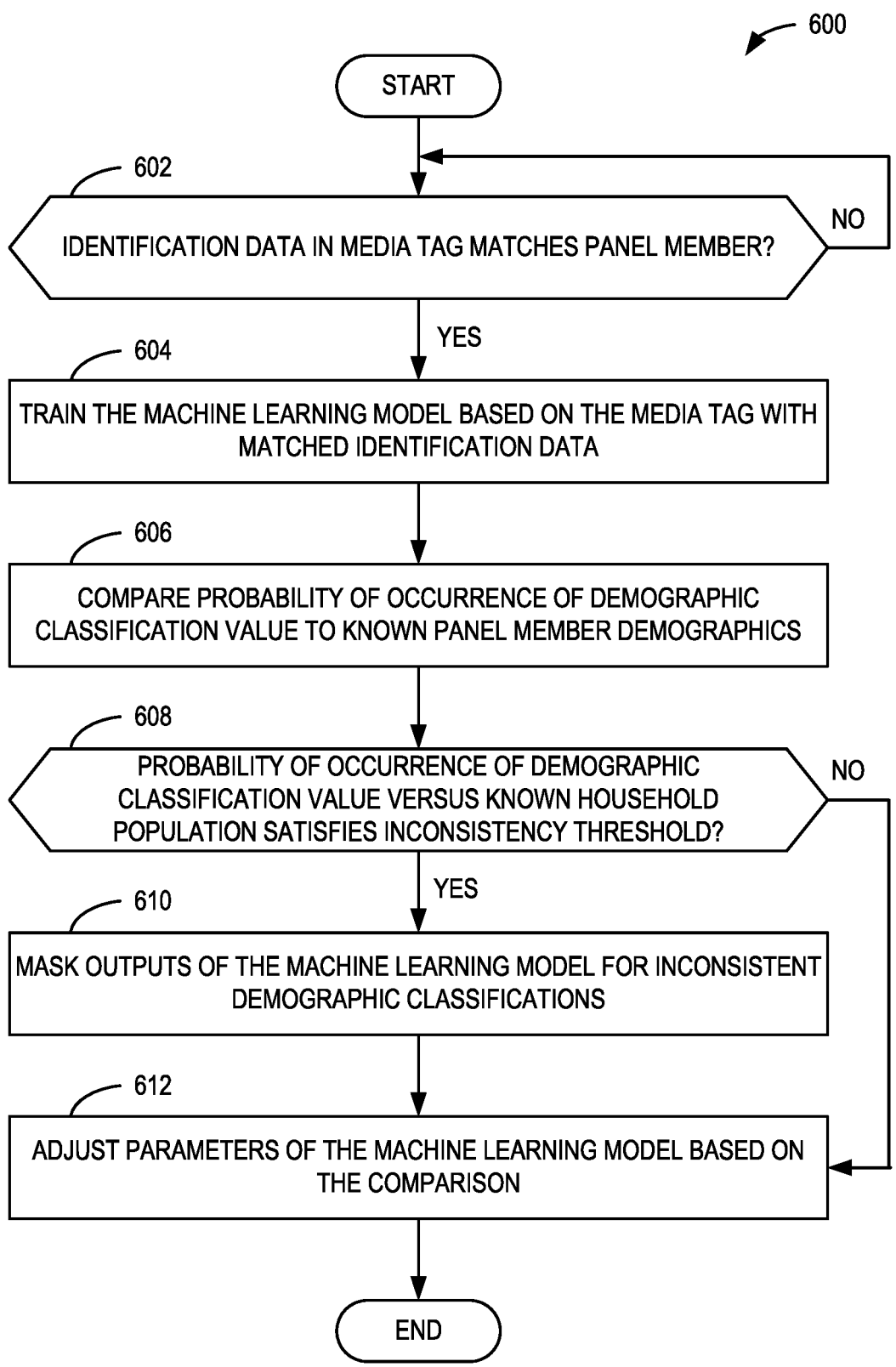
FIG. 6 is a flowchart representative of example machine readable instructions and/or example operations that may be executed and/or instantiated by processor circuitry to train a machine learning model to generate probabilities of occurrences of demographic classifications.

FIG. 6 is a flowchart representative of example machine readable instructions and/or example operations 600 that may be executed and/or instantiated by processor circuitry to train a machine learning model to generate probabilities of occurrences of demographic classifications. The machine readable instructions and/or the operations 600 of FIG. 6 begin at block 602, at which the example model training circuitry 316 determines whether identification data in a media tag matches the identification of a panel member. For example, a media tag may include an identification (ID) number that relates to a specific audience member (e.g., viewer) and the model training circuitry 316 may utilize media tags as training input from only audience members that fit a certain criteria, such as being a panel member associated with the AME 102. In some examples, the model training circuitry 316 designates media tags as training data if the ID of the audience member in the media tag is a panel member. In some examples, panel members have already provided access to their personal information by the AME 102, which allows specific tracking of their demographic classification by the AME 102. If the identification data in the media does not match, the process returns again to block 602. Otherwise, if the identification data does match, then the process continues at block 604.

At block 604, the example model training circuitry 316 trains the machine learning model based on the media tag with the matched identification data. For example, since the training data is limited to media tags that have matching identification data to panel members (based on the block 602 comparison), the model training circuitry 316 can train the machine learning model with census-level audience impression requests (e.g., which may have no personal identifying information of an audience member associated with them). In some examples, the machine learning model outputs a set of probabilities of occurrences of demographic classifications, based on the reformatted media tag input.

At block 606, the example model training circuitry 316 compares the probability of occurrence of a demographic classification value to the known panel member's demographic classification. For example, a known panel member's demographic classification may be a female between the ages of 30-39 and the probability of occurrence of that same demographic classification may be 0.72.

At block 608, the example model training circuitry 316 determines whether the probability of occurrence of the demographic classification value versus the known panel member's demographic classification satisfies an inconsistency threshold. In some examples, the model training circuitry 316 is provided database provider subscriber impression counts data 132 for census-level audience counts per demographic classification. For example, the database provider subscriber impression counts data 132 may provide counts of demographic classifications among a group of audience members, but does not provide individual identifying data or individual demographic classifications for a given impression request. For example, if a group of people are classified as a household, and training outputs show a probability of a first demographic classification as a non-zero value for that group of people, but the database provider subscriber impression counts data 132 verifies that zero audience members are part of the first demographic classification, then an inconsistency threshold may be met. For example, the machine learning model training output probability of males between the ages 20-29 is 0.14, but the database provider confirms (through the database provider subscriber impression counts data 132) that the count of male audience members between the ages of 20-29 is zero, then the inconsistency threshold may be met. In some examples, the inconsistency threshold may be any non-zero probability when compared to a zero count of actual audience member subscribers.

If the inconsistency threshold is satisfied, then the process continues at block 610. Otherwise, if the inconsistency threshold is not satisfied, then the process moves to block 612.

At block 610, the example model training circuitry 316 masks the outputs of the machine learning model for an inconsistent demographic classification. For example, the model training circuitry 316 may be provided the database proprietor subscriber impression counts 132 and an output of the machine learning model may include a probability of an occurrence of a demographic classification that is not zero, yet the database proprietor subscriber impression counts 132 of that same demographic classification may be zero. Thus, such an output may be masked from providing feedback back into training the one(s) of the algorithms 322, 324 during training of the machine learning model.

At block 612, the example model training circuitry 316 adjusts the parameters (e.g., weights, biases, etc.) of the machine learning model based on the comparison in block 606. For example, based on the training outputs, the example model training circuitry 316 can adjust model parameters to manipulate/adjust the one(s) of algorithms 322, 324 being executed as the machine learning model, which may allow future outputs (based on the media tag input) to reflect the actual known demographic classification(s) of the panel member(s). In some examples, the model parameters are adjusted to both raise the probabilities of demographic classifications that are known as present and lower the probabilities of demographic classifications that are known as not present. After block 612, the example instructions/operations 600 end.

Figure 7:
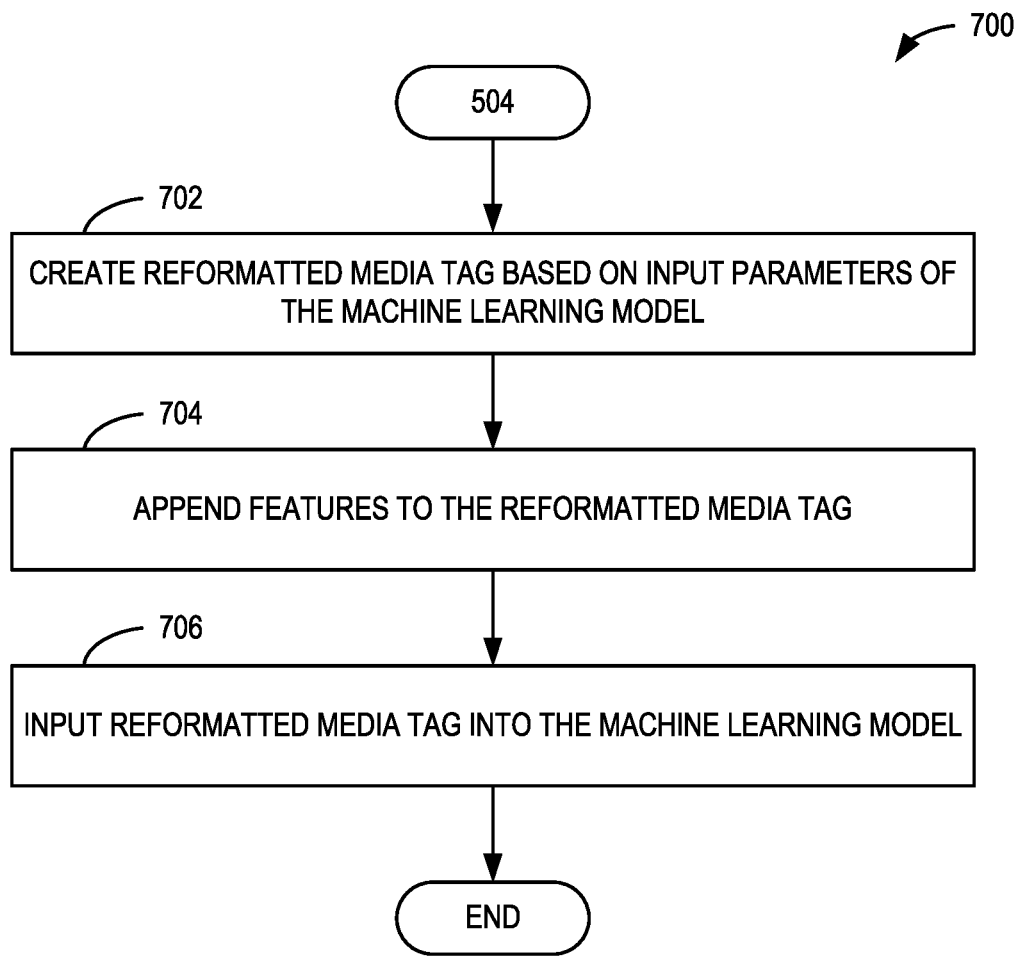
FIG. 7 is a flowchart representative of example machine readable instructions and/or example operations that may be executed and/or instantiated by processor circuitry to reformat a media tag for a machine learning model.

FIG. 7 is a flowchart representative of example machine readable instructions and/or example operations 700 that may be executed and/or instantiated by processor circuitry to reformat a media tag for a machine learning model. In some examples, the machine readable instructions and/or the operations 700 of FIG. 7 can be executed and/or instantiated by processor circuitry to implement block 504 of the machine readable instructions and/or the operations 500 of FIG. 5.

The machine readable instructions and/or the operations 700 of FIG. 7 begin at block 702, at which the example media tag format circuitry 310 creates a reformatted media tag based on the input parameters of the machine learning model. For example, the one(s) of algorithms 322, 324 may need as input the media tag to be in a certain alphanumeric format prior to being fed into the training machine learning model. The media tag may include both information about the audience member associated with the impression request 122b (which includes the media tag) (e.g., name, age, address, phone number, etc.) and information about the media being viewed (e.g., timestamp, media signature, title, etc.).

At block 704, the example media tag format circuitry 310 appends features to the reformatted media tag. For example, the features may include DMA, device type, daypart, database proprietor household demographics information, etc.

At block 706, the example media tag format circuitry 310 inputs the reformatted media tag with the appended information into the machine learning model as training input. After block 706, the example instructions/operations 700 end.

Figure 8:
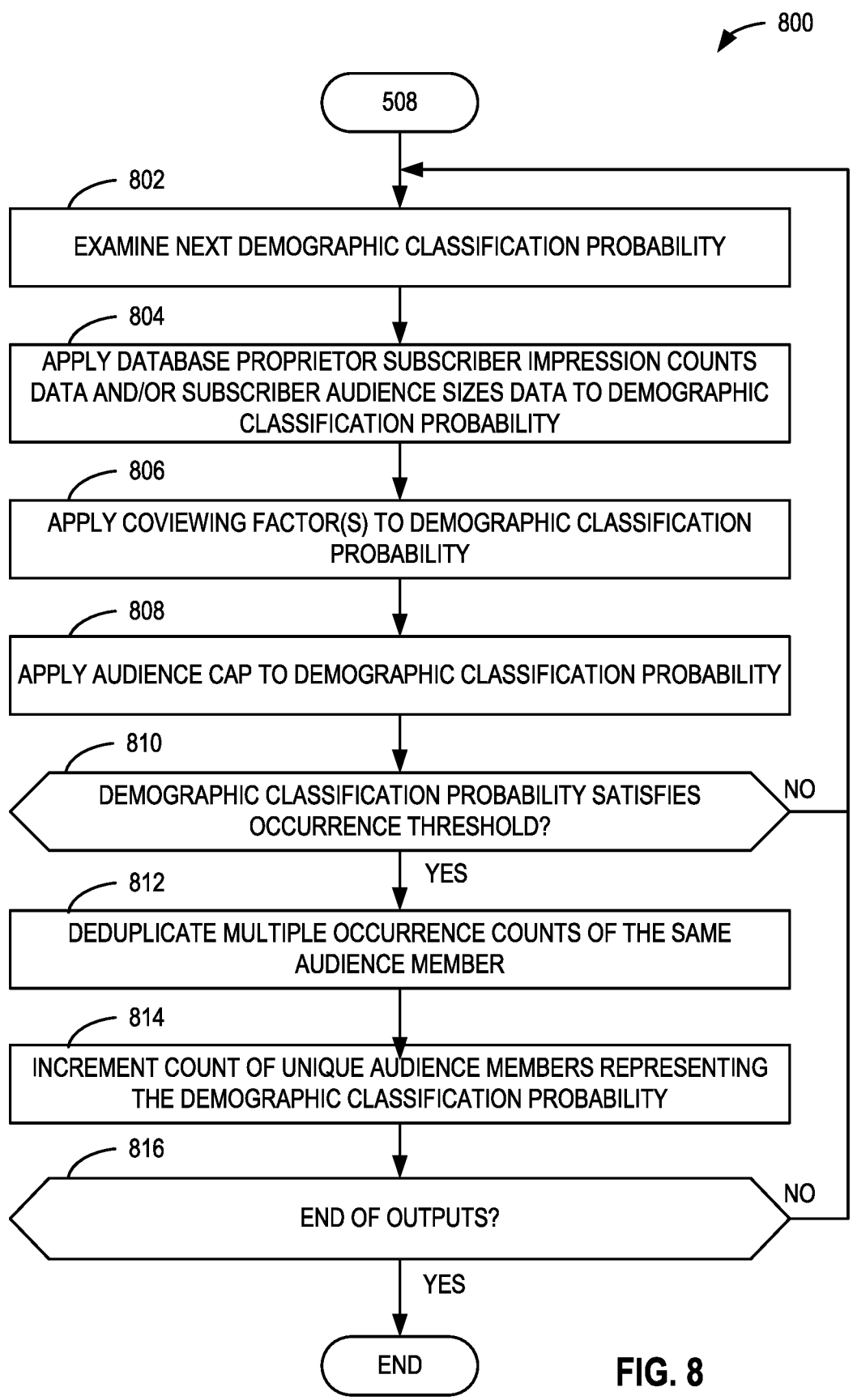
FIG. 8 is a flowchart representative of example machine readable instructions and/or example operations that may be executed and/or instantiated by processor circuitry to assign unique audience member counts to demographic classifications based on outputs from a machine learning model.

FIG. 8 is a flowchart representative of example machine readable instructions and/or example operations 800 that may be executed and/or instantiated by processor circuitry to assign unique audience member counts to demographic classifications based on outputs from a machine learning model. In some examples, the machine readable instructions and/or the operations 800 of FIG. 8 can be executed and/or instantiated by processor circuitry to implement block 508 of the machine readable instructions and/or the operations 800 of FIG. 8.

The machine readable instructions and/or the operations 800 of FIG. 8 begin at block 802, at which the example audience counting circuitry 318 examines a next demographic classification probability. For example, the audience counting circuitry 318 may traverse an entire set (e.g., list) of demographic classifications that are available to be counted and traverses the list one demographic classification at a time, starting with a first demographic classification. In some examples, the first time block 802 is executed and/or instantiated, the first demographic classification probability in the outputs is the data examined. In some examples, subsequent iterations of the execution and/or instantiation of block 802 use subsequent demographic classification probabilities in the outputs, until the full list of demographic classification probabilities from the outputs have been examined.

At block 804, the example audience counting circuitry 318 applies the database proprietor subscriber impression counts 132 and/or the database proprietor subscriber audience sizes data 134 (obtained from the database proprietor 106) to the demographic classification probability. For example, the audience counting circuitry 318 may obtain a probability output for a specific demographic classification that satisfies a threshold value but is inconsistent with a known value provided by the database proprietor subscriber impression counts 132. In such an example, the audience counting circuitry 318 may alter the demographic classification probability accordingly (e.g., such as alter the probability in the output to 0.0 if it is known that no person is a member of the current demographic classification in the traversal).

At block 806, the example audience counting circuitry 318 applies coviewing factor(s) to the current demographic classification probability. For example, multiple audience members in a current group being analyzed are in the same demographic classification category and they have generated impression requests 122b for the same piece of media, the audience counting circuitry 318 may increase an initial probability occurrence value of demographic classification to account for co-viewing of audience members.

At block 808, the example audience counting circuitry 318 applies an audience cap to the demographic classification probabilities and/or the counting mechanism to increment the counts. For example, if the database proprietor subscriber audience sizes data 134 indicates a total audience size for a group being analyzed, then the audience counting circuitry 318 may include a maximum total count of unique audience members not to be exceeded. For example, if there are enough model output probability of occurrences across the set of demographic classifications to positively determine that there should be 7 members in a group (spread among 7 or less demographic classifications), but the database proprietor subscriber audience sizes data 134 indicates that the group in question has a total of 5 audience members, then the audience counting circuitry 318 may apply a count increment among the different demographic classifications accordingly (e.g., only positively identify the highest 5 probabilities of occurrences among the set of all demographic classifications.

At block 810, once the potential modifications to the demographic classification probability are applied (in blocks 804, 806, and 808), then the example audience counting circuitry 318 determines whether the current demographic classification probability satisfies an occurrence threshold value. For example, there may be a standard demographic classification probability occurrence threshold value, such as 0.50 (e.g., the outputs of the model state that it is 50% likely there is at least one current audience member that meets the current demographic classification). In some examples, the example audience counting circuitry 318 determines the occurrence threshold of each audience member separately.

In some examples, the example audience counting circuitry 318 determines the occurrence thresholds of all members of a group of audience members together, such as those that are within a single household. In some examples where each audience member's occurrence threshold is determined separately, the example audience counting circuitry 318 sorts the probabilities of occurrences of each demographic classification from most likely to least likely and the demographic classification at the top of the list is determined to satisfy the occurrence threshold. The occurrence threshold value is compared against the output probability for the demographic classification in question. In some examples where the occurrence thresholds of groups of audience members are determined together, there may be multiple threshold levels for each demographic classification. For example, a probability of 0.0 to 0.09 may indicate zero audience members of that particular demographic classification are determined to be present in the group, a probability of 0.1 to 0.19 may indicate one audience member of that particular demographic classification is determined to be present in the group, and so on.

If the occurrence threshold is not satisfied, then the process returns to block 802. Otherwise, if the occurrence threshold is satisfied, then the process continues at block 812.

At block 812, the example audience counting circuitry 318 deduplicates any multiple occurrence counts of the same audience member. For example, if a first audience member within a group of audience members has generated two impression requests 122b for watching the same piece of media twice, and such a member's media tags have generated outputs that will satisfy an occurrence threshold for multiple members, that discrepancy is accounted for prior to incrementing any count of unique audience members. In some examples, the media tag format circuitry 310 performs deduplication on media tags input from the same audience member ID indicating that the same media was viewed multiple times. In some examples, the audience member may have watched the media on two different client devices 108, also generating multiple media tags for a single piece of media.

At block 814, the example audience counting circuitry 318 increments the count of unique audience members representing the demographic classification currently being examined. In some examples, the audience counting circuitry 318 accounts for any duplications of a single audience member accounting for multiple counts of a single unique audience member.

At block 816, the example audience counting circuitry 318 determines if the entire set of probability values that were output from the machine learning model have been traversed (e.g., the traversal is at the end of the outputs). If there are more outputs (e.g., more demographic classifications to examine), then the process returns to block 802. Otherwise, if there are no more outputs to examine, then after block 816, the example instructions/operations 800 end.

Figure 9:
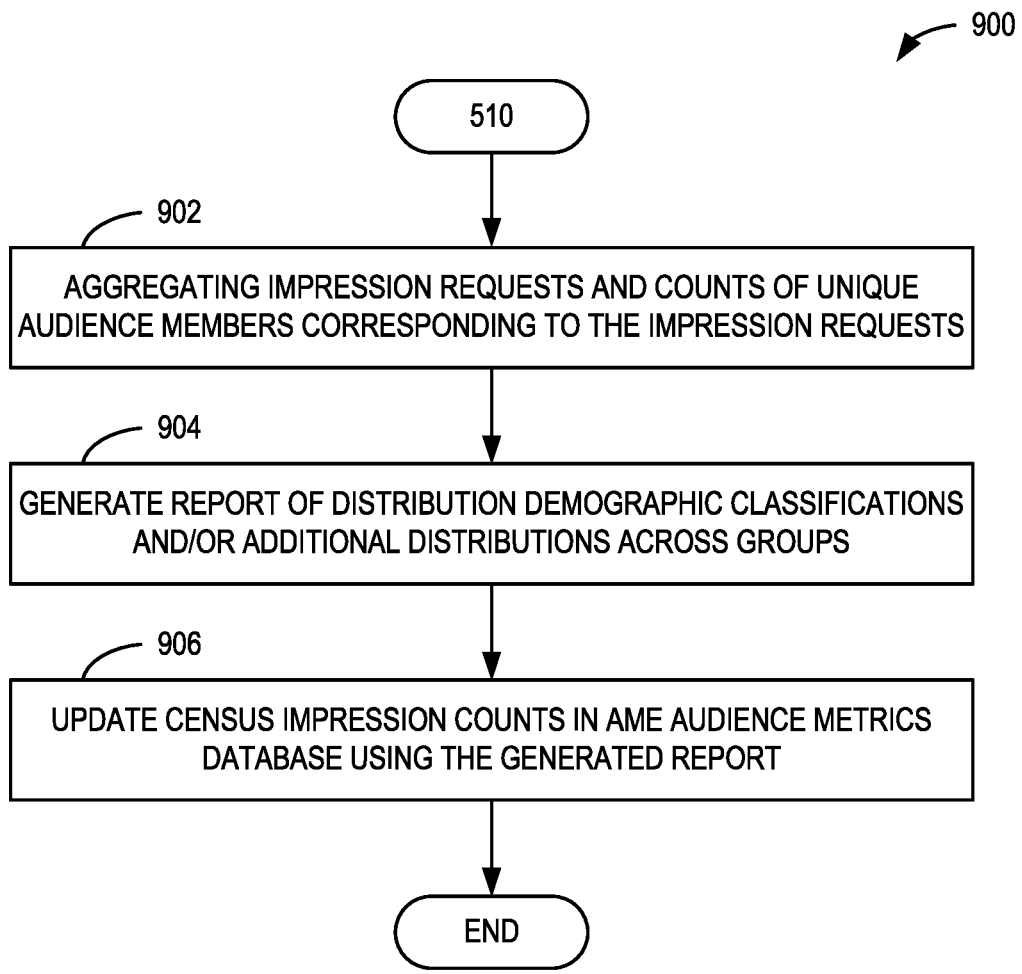
FIG. 9 is a flowchart representative of example machine readable instructions and/or example operations that may be executed and/or instantiated by processor circuitry to generate a report of aggregated impressions and audience sizes with determined demographic classifications.

FIG. 9 is a flowchart representative of example machine readable instructions and/or example operations 900 that may be executed and/or instantiated by processor circuitry to generate a report of aggregated impressions and audience sizes with determined demographic classifications. In some examples, the machine readable instructions and/or the operations 900 of FIG. 9 can be executed and/or instantiated by processor circuitry to implement block 510 of the machine readable instructions and/or the operations 500 of FIG. 5.

The example machine readable instructions and/or the operations 900 of FIG. 9 begin at block 902, at which the example aggregation reporting circuitry 320 aggregates the impression requests and counts of unique audience members of the group examined that correspond to the impression requests. For example, the aggregation reporting circuitry 320 may calculate demographic distributions as well as other possible distributions related to the obtained impression requests 122b.

At block 904, the example aggregation reporting circuitry 320 then may generate a report of such distributions (e.g., distribution of demographic classifications and/or additional distributions across the groups). For example, impression requests 122b may be received from a variety of households, where each household has a set of audience member views for a given piece of media, the aggregation and reporting may capture the distribution across a large set of households (e.g., a group of groups of audience members). In some examples, other distributions that may be reported could include daypart distributions of different viewed media, demographic breakdowns among households, among many other possible reports.

At block 906, the example aggregation reporting circuitry 320 updates census impression counts in the AME audience metrics database 126 using the generated report. In some examples, the updated census impression counts in the AME audience metrics database have an increased accuracy corresponding to a true count of census impressions from a base of subscribers (e.g., the true count being an actual number of census impressions from the subscribers).

Figure 10:
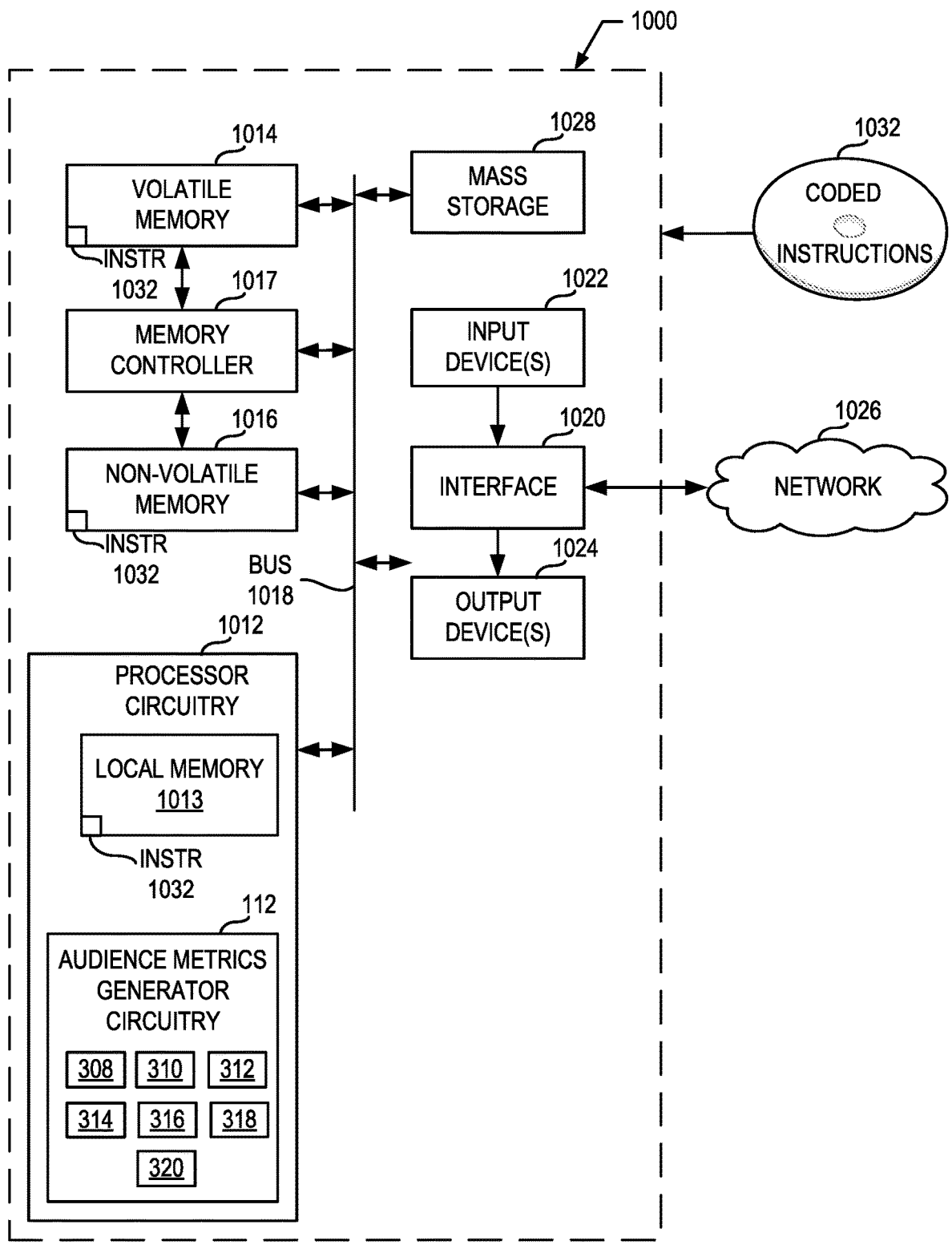
FIG. 10 is a block diagram of an example processing platform including processor circuitry structured to execute the example machine readable instructions of FIG. 5 to implement examples of determining demographic classifications for census level impression counts and unique audience sizes in accordance with teaching of this disclosure.

FIG. 10 is a block diagram of an example processor platform 1000 structured to execute and/or instantiate the machine readable instructions and/or the operations of FIGS. 5-9 to implement the apparatus of FIG. 3. The processor platform 1000 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset (e.g., an augmented reality (AR) headset, a virtual reality (VR) headset, etc.) or other wearable device, or any other type of computing device.

The processor circuitry 1012 of the illustrated example includes processor circuitry 1012. The processor circuitry 1012 of the illustrated example is hardware. For example, the processor circuitry 1012 can be implemented by one or more integrated circuits, logic circuits, FPGAs, microprocessors, CPUs, GPUs, DSPs, and/or microcontrollers from any desired family or manufacturer. The processor circuitry 1012 may be implemented by one or more semiconductor based (e.g., silicon based) devices. In this example, the processor circuitry 1012 implements the personal information match circuitry 308, the media tag format circuitry 310, the machine model manager 312, the model execution circuitry 314, the model training circuitry 316, the audience counting circuitry 318, the aggregation reporting circuitry 320 and/or, more generally, the audience metrics generator circuitry 112.

The processor circuitry 1012 of the illustrated example includes a local memory 1013 (e.g., a cache, registers, etc.). The processor circuitry 1012 of the illustrated example is in communication with a main memory including a volatile memory 1014 and a non-volatile memory 1016 by a bus 1018. The volatile memory 1014 may be implemented by Synchronous Dynamic Random Access Memory (SDRAM), Dynamic Random Access Memory (DRAM), RAMBUS® Dynamic Random Access Memory (RDRAM®), and/or any other type of RAM device. The non-volatile memory 1016 may be implemented by flash memory and/or any other desired type of memory device. Access to the main memory 1014, 1016 of the illustrated example is controlled by a memory controller 1017.

The processor platform 1000 of the illustrated example also includes interface circuitry 1020. The interface circuitry 1020 may be implemented by hardware in accordance with any type of interface standard, such as an Ethernet interface, a universal serial bus (USB) interface, a Bluetooth® interface, a near field communication (NFC) interface, a Peripheral Component Interconnect (PCI) interface, and/or a Peripheral Component Interconnect Express (PCIe) interface.

In the illustrated example, one or more input devices 1022 are connected to the interface circuitry 1020. The input device(s) 1022 permit(s) a user to enter data and/or commands into the processor circuitry 1012. The input device(s) 1022 can be implemented by, for example, an audio sensor, a microphone, a camera (still or video), a keyboard, a button, a mouse, a touchscreen, a track-pad, a trackball, an isopoint device, and/or a voice recognition system.

One or more output devices 1024 are also connected to the interface circuitry 1020 of the illustrated example. The output device(s) 1024 can be implemented, for example, by display devices (e.g., a light emitting diode (LED), an organic light emitting diode (OLED), a liquid crystal display (LCD), a cathode ray tube (CRT) display, an in-place switching (IPS) display, a touchscreen, etc.), a tactile output device, a printer, and/or speaker. The interface circuitry 1020 of the illustrated example, thus, typically includes a graphics driver card, a graphics driver chip, and/or graphics processor circuitry such as a GPU.

The interface circuitry 1020 of the illustrated example also includes a communication device such as a transmitter, a receiver, a transceiver, a modem, a residential gateway, a wireless access point, and/or a network interface to facilitate exchange of data with external machines (e.g., computing devices of any kind) by a network 1026. The communication can be by, for example, an Ethernet connection, a digital subscriber line (DSL) connection, a telephone line connection, a coaxial cable system, a satellite system, a line-of-site wireless system, a cellular telephone system, an optical connection, etc.

The processor platform 1000 of the illustrated example also includes one or more mass storage devices 1028 to store software and/or data. Examples of such mass storage devices 1028 include magnetic storage devices, optical storage devices, floppy disk drives, HDDs, CDs, Blu-ray disk drives, redundant array of independent disks (RAID) systems, solid state storage devices such as flash memory devices and/or SSDs, and DVD drives.

The machine readable instructions 1032, which may be implemented by the machine readable instructions of FIGS. 5-9, may be stored in the mass storage device 1028, in the volatile memory 1014, in the non-volatile memory 1016, and/or on a removable non-transitory computer readable storage medium such as a CD or DVD.

Figure 11:
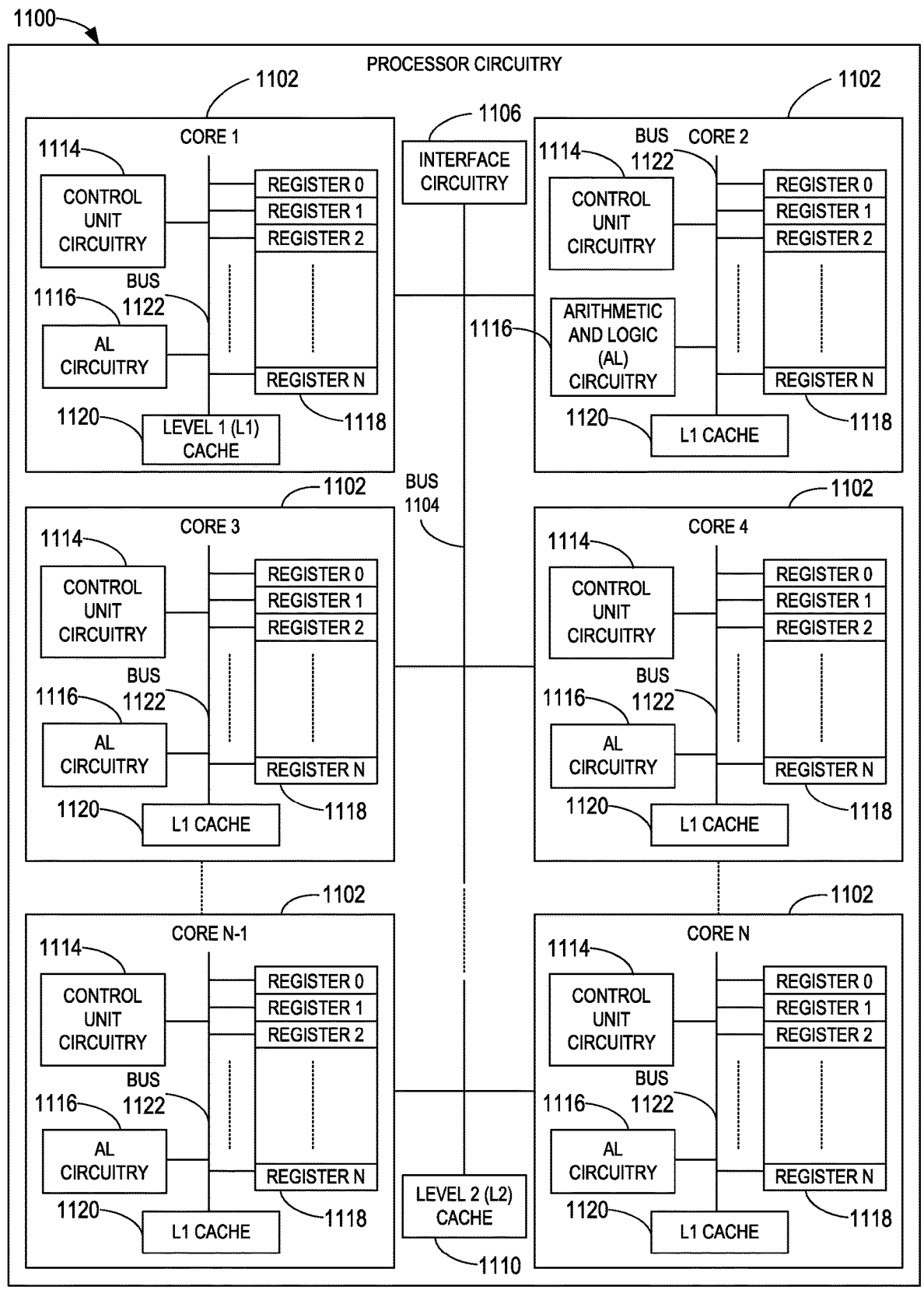
FIG. 11 is a block diagram of an example implementation of the processor circuitry of FIG. 10.

FIG. 11 is a block diagram of an example implementation of the processor circuitry 1012 of FIG. 10. In this example, the processor circuitry 1012 of FIG. 10 is implemented by a microprocessor 1100. For example, the microprocessor 1100 may be a general purpose microprocessor (e.g., general purpose microprocessor circuitry). The microprocessor 1100 executes some or all of the machine readable instructions of the flowcharts of FIGS. 5-9 to effectively instantiate the circuitry of FIG. 3 as logic circuits to perform the operations corresponding to those machine readable instructions. In some such examples, the circuitry of FIG. 3 is instantiated by the hardware circuits of the microprocessor 1100 in combination with the instructions. For example, the microprocessor 1100 may be implemented by multi-core hardware circuitry such as a CPU, a DSP, a GPU, an XPU, etc. Although it may include any number of example cores 1102 (e.g., 1 core), the microprocessor 1100 of this example is a multi-core semiconductor device including N cores. The cores 1102 of the microprocessor 1100 may operate independently or may cooperate to execute machine readable instructions. For example, machine code corresponding to a firmware program, an embedded software program, or a software program may be executed by one of the cores 1102 or may be executed by multiple ones of the cores 1102 at the same or different times. In some examples, the machine code corresponding to the firmware program, the embedded software program, or the software program is split into threads and executed in parallel by two or more of the cores 1102. The software program may correspond to a portion or all of the machine readable instructions and/or operations represented by the flowcharts of FIGS. 5-9.

The cores 1102 may communicate by a first example bus 1104. In some examples, the first bus 1104 may be implemented by a communication bus to effectuate communication associated with one(s) of the cores 1102. For example, the first bus 1104 may be implemented by at least one of an Inter-Integrated Circuit (I2C) bus, a Serial Peripheral Interface (SPI) bus, a PCI bus, or a PCIe bus. Additionally or alternatively, the first bus 1104 may be implemented by any other type of computing or electrical bus. The cores 1102 may obtain data, instructions, and/or signals from one or more external devices by example interface circuitry 1106. The cores 1102 may output data, instructions, and/or signals to the one or more external devices by the interface circuitry 1106. Although the cores 1102 of this example include example local memory 1120 (e.g., Level 1 (L1) cache that may be split into an L1 data cache and an L1 instruction cache), the microprocessor 1100 also includes example shared memory 1110 that may be shared by the cores (e.g., Level 2 (L2 cache)) for high-speed access to data and/or instructions. Data and/or instructions may be transferred (e.g., shared) by writing to and/or reading from the shared memory 1110. The local memory 1120 of each of the cores 1102 and the shared memory 1110 may be part of a hierarchy of storage devices including multiple levels of cache memory and the main memory (e.g., the main memory 1014, 1016 of FIG. 10). Typically, higher levels of memory in the hierarchy exhibit lower access time and have smaller storage capacity than lower levels of memory. Changes in the various levels of the cache hierarchy are managed (e.g., coordinated) by a cache coherency policy.

Each core 1102 may be referred to as a CPU, DSP, GPU, etc., or any other type of hardware circuitry. Each core 1102 includes control unit circuitry 1114, arithmetic and logic (AL) circuitry (sometimes referred to as an ALU) 1116, a plurality of registers 1118, the local memory 1120, and a second example bus 1122. Other structures may be present. For example, each core 1102 may include vector unit circuitry, single instruction multiple data (SIMD) unit circuitry, load/store unit (LSU) circuitry, branch/jump unit circuitry, floating-point unit (FPU) circuitry, etc. The control unit circuitry 1114 includes semiconductor-based circuits structured to control (e.g., coordinate) data movement within the corresponding core 1102. The AL circuitry 1116 includes semiconductor-based circuits structured to perform one or more mathematic and/or logic operations on the data within the corresponding core 1102. The AL circuitry 1116 of some examples performs integer based operations. In other examples, the AL circuitry 1116 also performs floating point operations. In yet other examples, the AL circuitry 1116 may include first AL circuitry that performs integer based operations and second AL circuitry that performs floating point operations. In some examples, the AL circuitry 1116 may be referred to as an Arithmetic Logic Unit (ALU). The registers 1118 are semiconductor-based structures to store data and/or instructions such as results of one or more of the operations performed by the AL circuitry 1116 of the corresponding core 1102. For example, the registers 1118 may include vector register(s), SIMD register(s), general purpose register(s), flag register(s), segment register(s), machine specific register(s), instruction pointer register(s), control register(s), debug register(s), memory management register(s), machine check register(s), etc. The registers 1118 may be arranged in a bank as shown in FIG. 11. Alternatively, the registers 1118 may be organized in any other arrangement, format, or structure including distributed throughout the core 1102 to shorten access time. The second bus 1122 may be implemented by at least one of an I2C bus, a SPI bus, a PCI bus, or a PCIe bus Each core 1102 and/or, more generally, the microprocessor 1100 may include additional and/or alternate structures to those shown and described above. For example, one or more clock circuits, one or more power supplies, one or more power gates, one or more cache home agents (CHAs), one or more converged/common mesh stops (CMSs), one or more shifters (e.g., barrel shifter(s)) and/or other circuitry may be present. The microprocessor 1100 is a semiconductor device fabricated to include many transistors interconnected to implement the structures described above in one or more integrated circuits (ICs) contained in one or more packages. The processor circuitry may include and/or cooperate with one or more accelerators. In some examples, accelerators are implemented by logic circuitry to perform certain tasks more quickly and/or efficiently than can be done by a general purpose processor. Examples of accelerators include ASICs and FPGAs such as those discussed herein. A GPU or other programmable device can also be an accelerator. Accelerators may be on-board the processor circuitry, in the same chip package as the processor circuitry and/or in one or more separate packages from the processor circuitry.

FIG. 6 is a block diagram of another example implementation of the processor circuitry 1012 of FIG. 10. In this example, the processor circuitry 1012 is implemented by FPGA circuitry 1200. For example, the FPGA circuitry 1200 may be implemented by an FPGA. The FPGA circuitry 1200 can be used, for example, to perform operations that could otherwise be performed by the example microprocessor 1100 of FIG. 11 executing corresponding machine readable instructions. However, once configured, the FPGA circuitry 1200 instantiates the machine readable instructions in hardware and, thus, can often execute the operations faster than they could be performed by a general purpose microprocessor executing the corresponding software.

Figure 12:
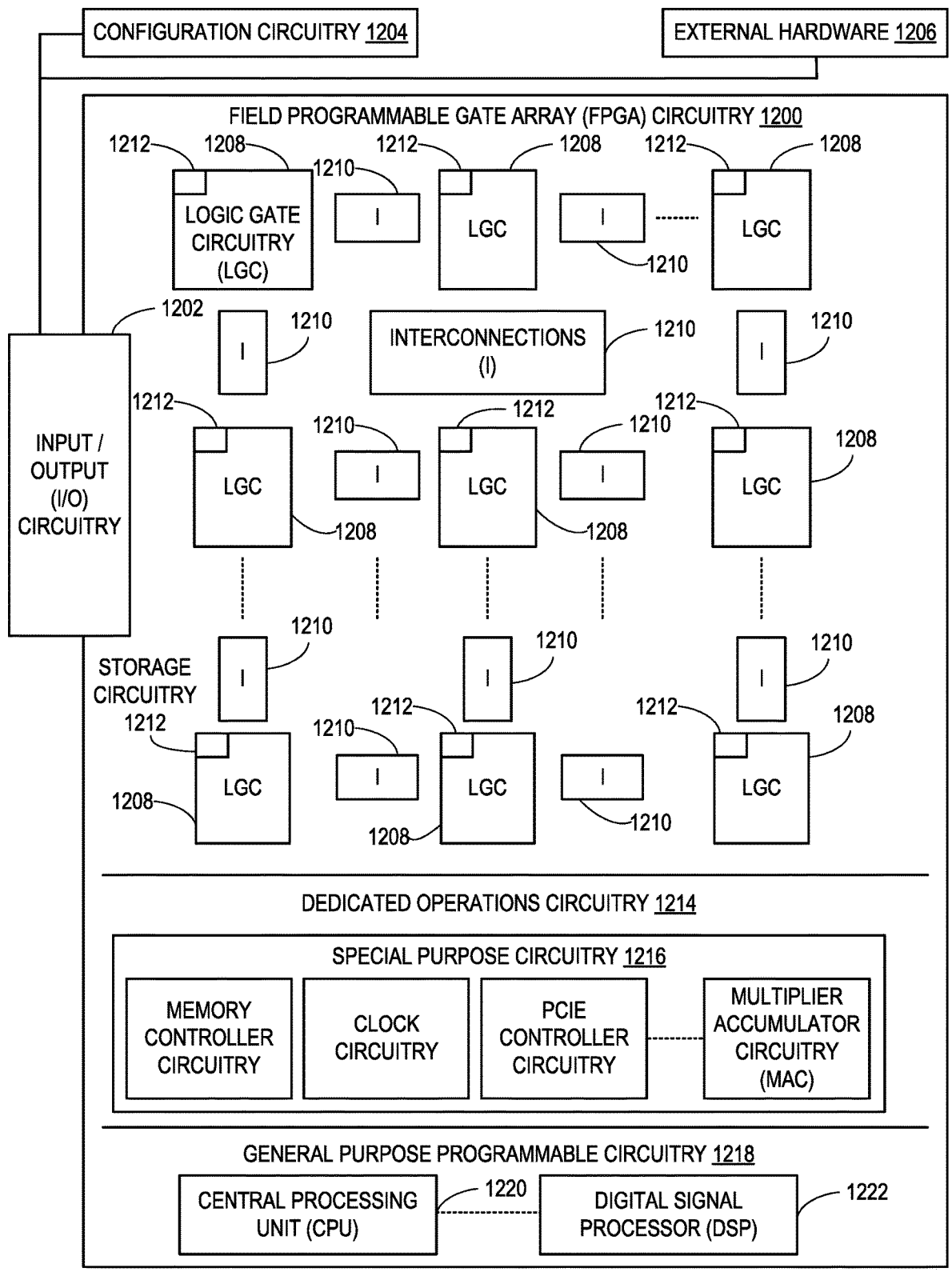
FIG. 12 is a block diagram of another example implementation of the processor circuitry of FIG. 10.

More specifically, in contrast to the microprocessor 1100 of FIG. 11 described above (which is a general purpose device that may be programmed to execute some or all of the machine readable instructions represented by the flowcharts of FIGS. 5-9 but whose interconnections and logic circuitry are fixed once fabricated), the FPGA circuitry 1200 of the example of FIG. 12 includes interconnections and logic circuitry that may be configured and/or interconnected in different ways after fabrication to instantiate, for example, some or all of the machine readable instructions represented by the flowcharts of FIGS. 5-9. In particular, the FPGA circuitry 1200 may be thought of as an array of logic gates, interconnections, and switches. The switches can be programmed to change how the logic gates are interconnected by the interconnections, effectively forming one or more dedicated logic circuits (unless and until the FPGA circuitry 1200 is reprogrammed). The configured logic circuits enable the logic gates to cooperate in different ways to perform different operations on data received by input circuitry. Those operations may correspond to some or all of the software represented by the flowcharts of FIGS. 5-9. As such, the FPGA circuitry 1200 may be structured to effectively instantiate some or all of the machine readable instructions of the flowcharts of FIGS. 5-9 as dedicated logic circuits to perform the operations corresponding to those software instructions in a dedicated manner analogous to an ASIC. Therefore, the FPGA circuitry 1200 may perform the operations corresponding to the some or all of the machine readable instructions of FIGS. 5-9 faster than the general purpose microprocessor can execute the same.

In the example of FIG. 12, the FPGA circuitry 1200 is structured to be programmed (and/or reprogrammed one or more times) by an end user by a hardware description language (HDL) such as Verilog. The FPGA circuitry 1200 of FIG. 12, includes example input/output (I/O) circuitry 1202 to obtain and/or output data to/from example configuration circuitry 1204 and/or external hardware 1206. For example, the configuration circuitry 1204 may be implemented by interface circuitry that may obtain machine readable instructions to configure the FPGA circuitry 1200, or portion(s) thereof. In some such examples, the configuration circuitry 1204 may obtain the machine readable instructions from a user, a machine (e.g., hardware circuitry (e.g., programmed or dedicated circuitry) that may implement an Artificial Intelligence/Machine Learning (AI/ML) model to generate the instructions), etc. In some examples, the external hardware 1206 may be implemented by external hardware circuitry. For example, the external hardware 1206 may be implemented by the microprocessor 1100 of FIG. 11. The FPGA circuitry 1200 also includes an array of example logic gate circuitry 1208, a plurality of example configurable interconnections 1210, and example storage circuitry 1212. The logic gate circuitry 1208 and the configurable interconnections 1210 are configurable to instantiate one or more operations that may correspond to at least some of the machine readable instructions of FIGS. 5-9 and/or other desired operations. The logic gate circuitry 1208 shown in FIG. 12 is fabricated in groups or blocks. Each block includes semiconductor-based electrical structures that may be configured into logic circuits. In some examples, the electrical structures include logic gates (e.g., And gates, Or gates, Nor gates, etc.) that provide basic building blocks for logic circuits. Electrically controllable switches (e.g., transistors) are present within each of the logic gate circuitry 1208 to enable configuration of the electrical structures and/or the logic gates to form circuits to perform desired operations. The logic gate circuitry 1208 may include other electrical structures such as look-up tables (LUTs), registers (e.g., flip-flops or latches), multiplexers, etc.

The configurable interconnections 1210 of the illustrated example are conductive pathways, traces, vias, or the like that may include electrically controllable switches (e.g., transistors) whose state can be changed by programming (e.g., using an HDL instruction language) to activate or deactivate one or more connections between one or more of the logic gate circuitry 1208 to program desired logic circuits.

The storage circuitry 1212 of the illustrated example is structured to store result(s) of the one or more of the operations performed by corresponding logic gates. The storage circuitry 1212 may be implemented by registers or the like. In the illustrated example, the storage circuitry 1212 is distributed amongst the logic gate circuitry 1208 to facilitate access and increase execution speed.

The example FPGA circuitry 1200 of FIG. 12 also includes example Dedicated Operations Circuitry 1214. In this example, the Dedicated Operations Circuitry 1214 includes special purpose circuitry 1216 that may be invoked to implement commonly used functions to avoid the need to program those functions in the field. Examples of such special purpose circuitry 1216 include memory (e.g., DRAM) controller circuitry, PCIe controller circuitry, clock circuitry, transceiver circuitry, memory, and multiplier-accumulator circuitry. Other types of special purpose circuitry may be present. In some examples, the FPGA circuitry 1200 may also include example general purpose programmable circuitry 1218 such as an example CPU 1220 and/or an example DSP 1222. Other general purpose programmable circuitry 1218 may additionally or alternatively be present such as a GPU, an XPU, etc., that can be programmed to perform other operations.

Although FIGS. 11 and 6 illustrate two example implementations of the processor circuitry 1012 of FIG. 10, many other approaches are contemplated. For example, as mentioned above, modern FPGA circuitry may include an on-board CPU, such as one or more of the example CPU 1220 of FIG. 12. Therefore, the processor circuitry 1012 of FIG. 10 may additionally be implemented by combining the example microprocessor 1100 of FIG. 11 and the example FPGA circuitry 1200 of FIG. 12. In some such hybrid examples, a first portion of the machine readable instructions represented by the flowcharts of FIGS. 5-9 may be executed by one or more of the cores 1102 of FIG. 11, a second portion of the machine readable instructions represented by the flowcharts of FIGS. 5-9 may be executed by the FPGA circuitry 1200 of FIG. 12, and/or a third portion of the machine readable instructions represented by the flowcharts of FIGS. 5-9 may be executed by an ASIC. It should be understood that some or all of the circuitry of FIG. 3 may, thus, be instantiated at the same or different times. Some or all of the circuitry may be instantiated, for example, in one or more threads executing concurrently and/or in series. Moreover, in some examples, some or all of the circuitry of FIG. 3 may be implemented within one or more virtual machines and/or containers executing on the microprocessor.

In some examples, the processor circuitry 1012 of FIG. 10 may be in one or more packages. For example, the microprocessor 1100 of FIG. 11 and/or the FPGA circuitry 1200 of FIG. 12 may be in one or more packages. In some examples, an XPU may be implemented by the processor circuitry 1012 of FIG. 10, which may be in one or more packages. For example, the XPU may include a CPU in one package, a DSP in another package, a GPU in yet another package, and an FPGA in still yet another package.

Figure 13:
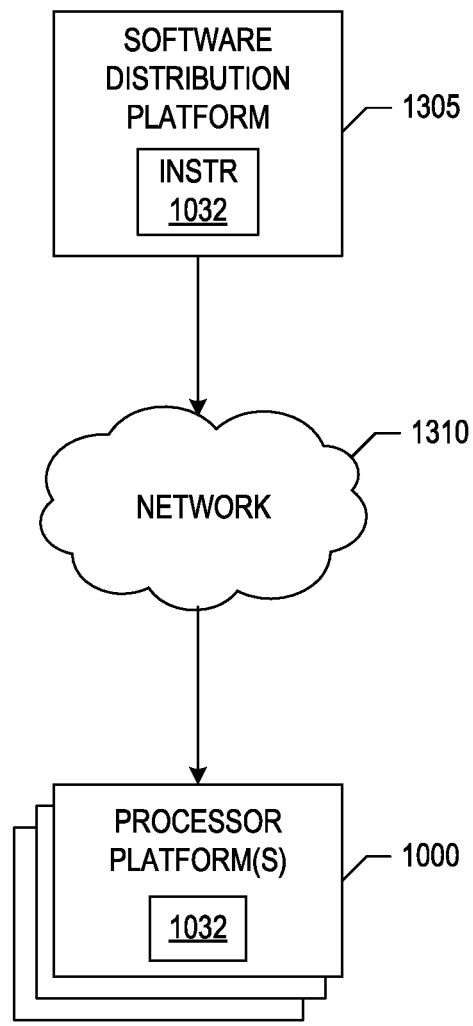
FIG. 13 is a block diagram of an example software distribution platform (e.g., one or more servers) to distribute software (e.g., software corresponding to the example machine readable instructions of FIG. 5) to client devices associated with end users and/or consumers (e.g., for license, sale, and/or use), retailers (e.g., for sale, re-sale, license, and/or sub-license), and/or original equipment manufacturers (OEMs) (e.g., for inclusion in products to be distributed to, for example, retailers and/or to other end users such as direct buy customers).

A block diagram illustrating an example software distribution platform 1305 to distribute software such as the example machine readable instructions 1032 of FIG. 10 to hardware devices owned and/or operated by third parties is illustrated in FIG. 13. The example software distribution platform 1305 may be implemented by any computer server, data facility, cloud service, etc., capable of storing and transmitting software to other computing devices. The third parties may be customers of the entity owning and/or operating the software distribution platform 1305. For example, the entity that owns and/or operates the software distribution platform 1305 may be a developer, a seller, and/or a licensor of software such as the example machine readable instructions 1032 of FIG. 10. The third parties may be consumers, users, retailers, OEMs, etc., who purchase and/or license the software for use and/or re-sale and/or sub-licensing. In the illustrated example, the software distribution platform 1305 includes one or more servers and one or more storage devices. The storage devices store the machine readable instructions 1032, which may correspond to the example machine readable instructions 500, 900, etc. of FIGS. 5-9, as described above. The one or more servers of the example software distribution platform 1305 are in communication with an example network 1310, which may correspond to any one or more of the Internet and/or any of the example networks described above. In some examples, the one or more servers are responsive to requests to transmit the software to a requesting party as part of a commercial transaction. Payment for the delivery, sale, and/or license of the software may be handled by the one or more servers of the software distribution platform and/or by a third party payment entity. The servers enable purchasers and/or licensors to download the machine readable instructions 1032 from the software distribution platform 1305. For example, the software, which may correspond to the example machine readable instructions 500, 900, etc. of FIGS. 5-9, may be downloaded to the example processor platform 1000, which is to execute the machine readable instructions 1032 to implement the audience metrics generator circuitry 112 of FIG. 3. In some examples, one or more servers of the software distribution platform 1305 periodically offer, transmit, and/or force updates to the software (e.g., the example machine readable instructions 1032 of FIG. 10) to ensure improvements, patches, updates, etc., are distributed and applied to the software at the end user devices.

From the foregoing, it will be appreciated that example systems, methods, apparatus, and articles of manufacture have been disclosed that determine demographic distributions for census level impression counts and audience sizes. Disclosed systems, methods, apparatus, and articles of manufacture improve the efficiency of using a computing device by using a machine learning model to predict the probability of demographic classifications of audience members in a group without the need to have each audience member's personal information, preserving privacy while providing accurate demographic distributions of audiences. Disclosed systems, methods, apparatus, and articles of manufacture are accordingly directed to one or more improvement(s) in the operation of a machine such as a computer or other electronic and/or mechanical device.

Further examples and combinations thereof include the following:

Example 1 includes an apparatus comprising a database, interface circuitry to communicatively couple a database to processor circuitry, and the processor circuitry including one or more of at least one of a central processor unit, a graphics processor unit, or a digital signal processor, the at least one of the central processor unit, the graphics processor unit, or the digital signal processor having control circuitry to control data movement within the processor circuitry, arithmetic and logic circuitry to perform one or more first operations corresponding to instructions, and one or more registers to store a result of the one or more first operations, the instructions in the apparatus, a Field ProgramMainBlocke Gate Array (FPGA), the FPGA including logic gate circuitry, a plurality of configurable interconnections, and storage circuitry, the logic gate circuitry and the plurality of the configurable interconnections to perform one or more second operations, the storage circuitry to store a result of the one or more second operations, or Application Specific Integrated Circuitry (ASIC) including logic gate circuitry to perform one or more third operations, the processor circuitry to perform at least one of the first operations, the second operations, or the third operations to instantiate media tag format circuitry to generate a reformatted media tag corresponding to an impression request, model execution circuitry to execute a machine learning model based on the reformatted media tag to generate outputs, the outputs including at least a value representative of a probability of an occurrence of a demographic classification, and audience counting circuitry to assign an identification of ones of audience members in a group to the demographic classification based at least on the outputs.

Example 2 includes the apparatus of example 1, wherein the processor circuitry to perform at least one of the first operations, the second operations, or the third operations is to instantiate personal information match circuitry to match identification data in the media tag to personal information in the database, and model training circuitry to train the machine learning model on the media tag.

Example 3 includes the apparatus of example 2, wherein the model training circuitry is to compare the probability of the occurrence of the demographic classification to a known population of audience members in the group, and adjust at least one parameter of the machine learning model based on the comparison of the probability of the occurrence of the demographic classification to the known population of audience members in the group.

Example 4 includes the apparatus of example 3, wherein the model training circuitry is to mask the outputs when the probability of the occurrence of the demographic classification satisfies an inconsistency threshold level against the known population of audience members in the group.

Example 5 includes the apparatus of example 1, wherein the media tag format circuitry is to create the formatted media tag based on input parameters of the machine learning model, and append ones of features to the formatted media tag.

Example 6 includes the apparatus of example 1, wherein the value is a first value, the demographic classification is a first demographic classification, the outputs include a plurality of values, the plurality of values including the first value, ones of the plurality of values are representative of ones of probabilities of occurrences of a plurality of demographic classifications, and the plurality of demographic classifications include the first demographic classification.

Example 7 includes the apparatus of example 6, wherein the audience counting circuitry is to increment a count of unique audience members in the group representing ones of the plurality of demographic classifications based on the ones of probabilities.

Example 8 includes the apparatus of example 7, wherein the impression request is a first impression request of a plurality of impression requests, the group is a first group of a plurality of groups, the count of unique audience members is a first count of unique audience members, and the processor circuitry to perform at least one of the first operations, the second operations, or the third operations is to instantiate aggregation reporting circuitry to aggregate ones of the plurality of impression requests and ones of counts of unique audience members representative of ones of groups of the plurality of groups, and generate a report of a distribution of demographic classifications across the ones of groups.

Example 9 includes a non-transitory machine readable storage medium comprising instructions that, when executed, cause processor circuitry to at least generate a reformatted media tag corresponding to an impression request, execute a machine learning model based on the reformatted media tag to generate outputs, the outputs including at least a value representative of a probability of an occurrence of a demographic classification, and assign an identification of ones of audience members in a group to the demographic classification based at least on the outputs.

Example 10 includes the non-transitory machine readable storage medium of example 9, wherein instructions cause the processor to at least match identification data in the media tag to personal information in a database, and train the machine learning model on the media tag.

Example 11 includes the non-transitory machine readable storage medium of example 10, wherein instructions cause the processor to at least compare the probability of the occurrence of the demographic classification to a known population of audience members in the group, and adjust at least one parameter of the machine learning model based on the comparison of the probability of the occurrence of the demographic classification to a known population of audience members in the group.

Example 12 includes the non-transitory machine readable storage medium of example 11, wherein instructions cause the processor to at least mask the outputs when the probability of the occurrence of the demographic classification satisfies an inconsistency threshold level against the known population of audience members in the group.

Example 13 includes the non-transitory machine readable storage medium of example 9, wherein instructions cause the processor to at least create the reformatted media tag based on input parameters of the machine learning model, and append ones of features to the reformatted media tag.

Example 14 includes the non-transitory machine readable storage medium of example 9, wherein the value is a first value and the demographic classification is a first demographic classification, the outputs include a plurality of values, the plurality of values including the first value, ones of the plurality of values are representative of ones of probabilities of occurrences of a plurality of demographic classifications, and the plurality of demographic classifications include the first demographic classification.

Example 15 includes the non-transitory machine readable storage medium of example 14, wherein instructions cause the processor to at least increment a count of unique audience members in the group representing ones of the plurality of demographic classifications based on the ones of probabilities.

Example 16 includes the non-transitory machine readable storage medium of example 15, wherein the impression request is a first impression request of a plurality of impression requests, the group is a first group of a plurality of groups, the count of unique audience members is a first count of unique audience members, wherein instructions cause the processor to at least aggregate ones of the plurality of impression requests and ones of counts of unique audience members representative of ones of groups of the plurality of groups, and generate a report of a distribution of demographic classifications across the ones of groups.

Example 17 includes a method, comprising generating a reformatted media tag corresponding to an impression request, executing a machine learning model based on the reformatted media tag to generate outputs, the outputs including at least a value representative of a probability of an occurrence of a demographic classification, and assigning an identification of ones of audience members in a group to the demographic classification based at least on the outputs.

Example 18 includes the method of example 17, further including matching identification data in the media tag to personal information in a database, and training the machine learning model on the media tag.

Example 19 includes the method example 18, further including comparing the probability of the occurrence of the demographic classification to a known population of audience members in the group, and adjusting at least one parameter of the machine learning model based on the comparison of the probability of the occurrence of the demographic classification to a known population of audience members in the group.

Example 20 includes the method of example 19, further including masking the outputs when the probability of the occurrence of the demographic classification satisfies an inconsistency threshold level against the known population of audience members in the group.

Example 21 includes the method of example 17, further including creating the reformatted media tag based on input parameters of the machine learning model, and appending ones of features to the reformatted media tag.

Example 22 includes the method of example 17, wherein the value is a first value and the demographic classification is a first demographic classification, the outputs include a plurality of values, the plurality of values including the first value, ones of the plurality of values are representative of ones of probabilities of occurrences of a plurality of demographic classifications, and the plurality of demographic classifications include the first demographic classification.

Example 23 includes the method example 22, further including incrementing a count of unique audience members in the group representing ones of the plurality of demographic classifications based on the ones of probabilities.

Example 24 includes the method of example 23, wherein the impression request is a first impression request of a plurality of impression requests, the group is a first group of a plurality of groups, the count of unique audience members is a first count of unique audience members, further including aggregating ones of the plurality of impression requests and ones of counts of unique audience members representative of ones of groups of the plurality of groups, and generating a report of a distribution of demographic classifications across the ones of groups.

The following claims are hereby incorporated into this Detailed Description by this reference, with each claim standing on its own as a separate embodiment of the present disclosure.

What is claimed is:

1. An audience measurement computing system comprising:
   a database;
   a network interface that communicatively couples the database to a processor; and
   the processor configured to, upon executing machine readable instructions, cause the audience measurement computing system to perform operations including one or more of:
   generating a reformatted media tag corresponding to an impression request;
   executing a machine learning model based on the reformatted media tag to generate outputs, the outputs including at least a value representative of a probability of an occurrence of a demographic classification; and
   assigning an identification of ones of audience members in a group to the demographic classification based at least on the outputs.

2. The audience measurement computing system of claim 1, wherein the operations further include:
   matching identification data in a media tag to personal information in the database to thereby generate the reformatted media tag; and
   training the machine learning model on the reformatted media tag.

3. The audience measurement computing system of claim 2, wherein training the machine learning model includes:
   comparing the probability of the occurrence of the demographic classification to a known population of audience members in the group; and
   adjusting at least one parameter of the machine learning model based on the comparison of the probability of the occurrence of the demographic classification to the known population of audience members in the group.

4. The audience measurement computing system of claim 3, wherein training the machine learning model further includes masking the outputs when the probability of the occurrence of the demographic classification satisfies an inconsistency threshold level against the known population of audience members in the group.

5. The audience measurement computing system of claim 1, wherein generating the reformatted media tag further includes:
   generating the reformatted media tag corresponding to the impression request based on input parameters of the machine learning model; and
   appending ones of features to the reformatted media tag.

6. The audience measurement computing system of claim 1, wherein the value is a first value, the demographic classification is a first demographic classification, the outputs include a plurality of values, the plurality of values including the first value, ones of the plurality of values are representative of ones of probabilities of occurrences of a plurality of demographic classifications, and the plurality of demographic classifications include the first demographic classification.

7. The audience measurement computing system of claim 6, wherein the operations further include incrementing a count of unique audience members in the group representing ones of the plurality of demographic classifications based on the ones of probabilities.

8. The audience measurement computing system of claim 7, wherein the impression request is a first impression request of a plurality of impression requests, the group is a first group of a plurality of groups, the count of unique audience members is a first count of unique audience members, and wherein the operations further include:
   aggregating ones of the plurality of impression requests and ones of counts of unique audience members representative of ones of groups of the plurality of groups; and
   generating a report of a distribution of demographic classifications across the ones of groups.

9. A non-transitory machine readable storage medium comprising instructions that, when executed, cause a processor to be configured to at least:
   generate a reformatted media tag corresponding to an impression request;
   execute a machine learning model based on the reformatted media tag to generate outputs, the outputs including at least a value representative of a probability of an occurrence of a demographic classification; and
   assign an identification of ones of audience members in a group to the demographic classification based at least on the outputs.

10. The non-transitory machine readable storage medium of claim 9, wherein the instructions further cause the processor to be configured to at least:
    match identification data in a media tag to personal information in a database to thereby generate the reformatted media tag; and
    train the machine learning model based on the reformatted media tag.

11. The non-transitory machine readable storage medium of claim 10, wherein the instructions further cause the processor to be configured to at least:
- compare the probability of the occurrence of the demographic classification to a known population of audience members in the group; and
- adjust at least one parameter of the machine learning model based on the comparison of the probability of the occurrence of the demographic classification to a known population of audience members in the group.

12. The non-transitory machine readable storage medium of claim 11, wherein the instructions further cause the processor to be configured to at least mask the outputs when the probability of the occurrence of the demographic classification satisfies an inconsistency threshold level against the known population of audience members in the group.

13. The non-transitory machine readable storage medium of claim 9, wherein the instructions further cause the processor to be configured to at least:
- generate the reformatted media tag corresponding to the impression request based on input parameters of the machine learning model; and
- append ones of features to the reformatted media tag.

14. The non-transitory machine readable storage medium of claim 9, wherein the value is a first value and the demographic classification is a first demographic classification, the outputs include a plurality of values, the plurality of values including the first value, ones of the plurality of values are representative of ones of probabilities of occurrences of a plurality of demographic classifications, and the plurality of demographic classifications include the first demographic classification.

15. The non-transitory machine readable storage medium of claim 14, wherein the instructions further cause the processor to be configured to at least:
- increment a count of unique audience members in the group representing ones of the plurality of demographic classifications based on the ones of probabilities.

16. The non-transitory machine readable storage medium of claim 15, wherein the impression request is a first impression request of a plurality of impression requests, the group is a first group of a plurality of groups, the count of unique audience members is a first count of unique audience members, wherein the instructions further cause the processor to be configured to at least:
- aggregate ones of the plurality of impression requests and ones of counts of unique audience members representative of ones of groups of the plurality of groups; and
- generate a report of a distribution of demographic classifications across the ones of groups.

17. A method, comprising:
- generating a reformatted media tag corresponding to an impression request;
- executing a machine learning model based on the reformatted media tag to generate outputs, the outputs including at least a value representative of a probability of an occurrence of a demographic classification; and
- assigning an identification of ones of audience members in a group to the demographic classification based at least on the outputs.

18. The method of claim 17, further including:
- matching identification data in a media tag to personal information in a database to thereby generate the reformatted media tag; and
- training the machine learning model based on the reformatted media tag.

19. The method claim 18, further including:
- comparing the probability of the occurrence of the demographic classification to a known population of audience members in the group; and
- adjusting at least one parameter of the machine learning model based on the comparison of the probability of the occurrence of the demographic classification to a known population of audience members in the group.

20. The method of claim 19, further including:
- masking the outputs when the probability of the occurrence of the demographic classification satisfies an inconsistency threshold level against the known population of audience members in the group.

21. The method of claim 17, further including:
- generating the reformatted media tag corresponding to the impression request based on input parameters of the machine learning model; and
- appending ones of features to the reformatted media tag.

22. The method of claim 17, wherein the value is a first value and the demographic classification is a first demographic classification, the outputs including a plurality of values, the plurality of values including the first value, ones of the plurality of values are representative of ones of probabilities of occurrences of a plurality of demographic classifications, and the plurality of demographic classifications include the first demographic classification.

23. The method claim 22, further including:
- incrementing a count of unique audience members in the group representing ones of the plurality of demographic classifications based on the ones of probabilities.

24. The method of claim 23, wherein the impression request is a first impression request of a plurality of impression requests, the group is a first group of a plurality of groups, the count of unique audience members is a first count of unique audience members, and wherein the method further includes:
- aggregating ones of the plurality of impression requests and ones of counts of unique audience members representative of ones of groups of the plurality of groups; and
- generating a report of a distribution of demographic classifications across the ones of groups.

* * * * *